(12) United States Patent
Huang et al.

(10) Patent No.: US 11,759,999 B2
(45) Date of Patent: Sep. 19, 2023

(54) METHODS AND APPARATUSES FOR SOLVENT-ASSISTED POLYMER DIRECT PRINTING IN AIR

(71) Applicant: UNIVERSITY OF FLORIDA RESEARCH FOUNDATION, INCORPORATED, Gainesville, FL (US)

(72) Inventors: Yong Huang, Gainesville, FL (US); Marc Sole Gras, Gainesville, FL (US); Bing Ren, Gainesville, FL (US)

(73) Assignee: UNIVERSITY OF FLORIDA RESEARCH FOUNDATION, INCORPORATED, Gainesville, FL (US)

( * ) Notice: Subject to any disclaimer, the term of this patent is extended or adjusted under 35 U.S.C. 154(b) by 324 days.

(21) Appl. No.: 16/781,336

(22) Filed: Feb. 4, 2020

(65) Prior Publication Data

US 2021/0237340 A1    Aug. 5, 2021

(51) Int. Cl.
*B29C 64/112*    (2017.01)
*B33Y 10/00*    (2015.01)
(Continued)

(52) U.S. Cl.
CPC ............ *B29C 64/112* (2017.08); *B29C 64/30* (2017.08); *B33Y 10/00* (2014.12); *B33Y 30/00* (2014.12);
(Continued)

(58) Field of Classification Search
CPC ..... B29C 64/20; B29C 64/205; B29C 64/209; B29C 64/106; B29C 64/124; B29C 64/10
See application file for complete search history.

(56) References Cited

U.S. PATENT DOCUMENTS

2010/0297213 A1* 11/2010 Dupont .................... B05D 1/04
424/447
2016/0067918 A1    3/2016 Millar
(Continued)

FOREIGN PATENT DOCUMENTS

WO    WO-2015/017421 A2    2/2015

OTHER PUBLICATIONS

Hinton, Thomas J. et al. *3D Printing PDMS Elastomer in a Hydrophilic Support Bath Via Freeform Reversible Embedding*, ACS Biomaterials Science & Engineering, vol. 2, No. 10, (2016), pp. 1781-1786. DOI: 10.2021/acsbiomaterials.6b00170.
(Continued)

*Primary Examiner* — Monica A Huson
*Assistant Examiner* — Kelsey C Grace
(74) *Attorney, Agent, or Firm* — ALSTON & BIRD LLP

(57) ABSTRACT

A polymer three-dimensional (3D) printing methodology is disclosed for freeform fabrication of polymeric structures under ambient conditions without the use of printed support structures, without use of a support bath, and the like. The build material can be dissolved in a suitable solvent for 3D printing. The polymer solution can be printed (e.g., continuously printed using a moving dispensing nozzle) in air without the use of supports (e.g., without the use of a support bath, a concurrently printed support posts, or the like) while a nebulized coagulation agent is dispersed alongside the printed polymer solution to at least partially coagulate the polymer solution and form an intermediate article. The self-supporting intermediate article may then be immersed in a post-printing coagulation solution to remove some or all of the remaining solvent, causing the build material to fully solidify to form a finished article from the intermediate article.

21 Claims, 9 Drawing Sheets

(51) Int. Cl.
- B33Y 30/00 (2015.01)
- B29C 64/30 (2017.01)
- B33Y 40/20 (2020.01)
- B29C 64/393 (2017.01)
- B33Y 50/02 (2015.01)

(52) U.S. Cl.
CPC ............ *B33Y 40/20* (2020.01); *B29C 64/393* (2017.08); *B33Y 50/02* (2014.12)

(56) References Cited

U.S. PATENT DOCUMENTS

| | | | |
|---|---|---|---|
| 2016/0250808 A1* | 9/2016 | Barnwell, III | B29C 64/106 264/401 |
| 2018/0021140 A1 | 1/2018 | Angelini et al. | |
| 2018/0281295 A1 | 10/2018 | Tibbits et al. | |
| 2018/0282923 A1* | 10/2018 | Carlyle | D04H 3/016 |
| 2018/0370116 A1* | 12/2018 | Huang | B41J 2/2135 |
| 2019/0092951 A1 | 3/2019 | Wang et al. | |
| 2019/0375149 A1* | 12/2019 | Limem | A61L 31/16 |

OTHER PUBLICATIONS

Jin, Yifei et al. *Functional Nanoclay Suspension for Printing-Then-Solidification of Liquid Materials*, ACS Applied Materials & Interfaces, vol. 9, No. 23, (2017), pp. S1-S29. 20057-20066.

Jin, Yifei et al. *Granular Gel Support-Enabled Extrusion of Three-Dimensional Alginate and Cellular Structures*, Biofabrication, vol. 8, No. 2: 025016, (2016), pp. 1-21.

Jin, Yifei et al. *Printability Study of Hydrogel Solution Extrusion in Nanoclay Yield-Stress Bath During Printing-Then-Gelation Biofabrication*, Materials Science and Engineering: C, vol. 80, pp. 313-325, (2017), DOI: 10.1016/j.msec.2017.05.144.

O'Bryan, Christopher S. et al. *Self-Assembled Micro-Organogels for 3D Printing Silicone Structures*, Science Advances, vol. 3, No. 5:e1602800, May 10, 2017, pp. 1-8.

Hinton, Thomas J. et al. *Three-Dimensional Printing of Complex Biological Structures by Freeform Reversible Embedding of Suspended Hydrogels*. Science Advances, vol. 1, No. 9:e1500758, Oct. 23, 2015, (24 pages).

O'Bryan, Christopher S. et al. (2017). *Three-Dimensional Printing With Sacrificial Materials for Soft Matter Manufacturing*. MRS Bulletin, vol. 42, No. 8, pp. 571-577. DOI: 10.1557/mrs.2017.167.

Bhattacharjee, Tapomony et al. *Writing in the Granular Gel Medium*. Science Advances, vol. 1, No. 8:e16500655, Sep. 25, 2015, pp. 1-6.

Notice of Allowance and Fee(s) Due for U.S. Appl. No. 16/703,686, dated Jan. 28, 2021, (11 pages), United States Patent and Trademark Office, USA.

Final Office Action for U.S. Appl. No. 16/707,087, dated Dec. 29, 2021, (17 pages), United States Patent and Trademark Office.

Grosskopf, Abigail K. et al. Viscoplastic Matrix Materials for Embedding 3D Printing, ACS Applied Materials & Interfaces 2018, vol. 10, No. 27, p. 23353-23361, Mar. 1, 2018, https://doi.org/10.1021/acsami.7b19818.

Non-Final Office Action for U.S. Appl. No. 16/707,087, dated Aug. 3, 2021, (18 pages), United States Patent and Trademark Office, USA.

Notice of Allowance and Fee(s) Due for U.S. Appl. No. 16/707,087, dated Apr. 25, 2022, (23 pages), United States Patent and Trademark Office, US.

Whitby, Catherine P. et al. "Understanding the Role of Hydrogen Bonding in the Aggretation of Fumed Silica Particles in Triglyceride Solvents," *Journal of Colloid and Interface Science*, vol. 527, May 12, 2018, pp. 1-9.

* cited by examiner

50 dissolving the polymeric material in the solvent to form the liquid build material — 54 forming a liquid build material, the liquid build material comprising a polymeric material in a solvent — 51 disposing the liquid build material into a volume of air — 52 spraying a nebulized coagulation agent within a predetermined distance of the disposed liquid build material to at least partially coagulate the liquid build material, thereby forming the article — 53

→ disposing a first volume of a liquid build material onto a substrate — 61

→ within a predetermined time following disposing the first volume of the liquid build material onto the substrate, spraying a first volume of a nebulized coagulation agent within a predetermined distance of the disposed first volume of the liquid build material to at least partially coagulate the first volume of the first volume of the liquid build material — 62

→ disposing a second volume of the liquid build material onto at least a portion of the at least partially coagulated first volume of the liquid build material — 63

→ within the predetermined time following disposing the second volume of the liquid build material onto at least the portion of the at least partially coagulated first volume of the liquid build material, spraying a second volume of the nebulized coagulation agent within the predetermined distance of the disposed second volume of the liquid build material to at least partially coagulate the second volume of the liquid build material — 64

METHODS AND APPARATUSES FOR SOLVENT-ASSISTED POLYMER DIRECT PRINTING IN AIR

GOVERNMENT SUPPORT STATEMENT

This invention was made with government support under 1762941 awarded by the National Science Foundation. The government has certain rights in the invention.

TECHNICAL FIELD

Embodiments described herein relate generally to additive manufacturing, and more particularly to freeform additive manufacturing of polymeric materials.

BACKGROUND

Additive manufacturing, also referred to as three-dimensional (3D) printing, encompasses a range of technologies used to fabricate parts by adding material to build up the part rather than by subtracting unwanted material away from a bulk starting workpiece. Generally, 3D printing forms parts by depositing and/or solidifying build material layer-by-layer in computer-controlled patterns generated from a digital part model; each layer forms a thin slice of the complete part and the layers are integrated to form a tangible part based on the digital model. In fused deposition modeling (FDM), a widely implemented type of 3D printing, a thermoplastic build material in the form of a filament is melted and extruded from a hot tip to generate 3D parts layer-by-layer in a controlled spatial pattern; as in other 3D printing processes, the part is first generated as a computer model, then transformed into commands for a 3D printer. FDM can be used for fabricating prototypes and products from rigid thermoplastic polymer materials, such as poly(lactic acid) (PLA) and acrylonitrile-butadiene-styrene (ABS). However, a heating unit and process are required to melt the polymer and make it printable through the tip.

As FDM printing technology continues to mature, there is a demand for more versatile approaches which are compatible with a wider range of polymeric build materials to fabricate more complex prototypes and end-use parts with a broad range of properties and features under milder conditions.

SUMMARY

A polymer three-dimensional (3D) printing method and associated apparatus are disclosed for fabrication of 3D printed structures and articles. In some embodiments, the fabrication may be freeform fabrication. In some embodiments, the 3D printed structures and articles may be formed from a build material, such as a polymeric material with the assistance of a solvent or a polymer/solvent solution.

In some embodiments, 3D printed structures and articles may be fabricated under ambient conditions and/or without the use of printed support structures which would need to be removed after 3D printing in order to achieve the finished structure or article. In some embodiments, a build material can be dissolved in a suitable solvent or solvent solution (e.g., solvent/non-solvent mixture) such that the resulting solution is a suitable ink for 3D printing. In some embodiments, the build material can comprise one or more polymers or a polymer solution. In some embodiments, the ink, comprising the build material, can be disposed within a printing volume or onto a printing platform without the use of supports or other structures being previously, concurrently, or subsequently printed to support the build material while the build material solidifies. In some embodiments, freeform printing can be carried out at ambient temperature and pressure. In some embodiments, just previous to, concurrent with, or just following the disposition of ink into the printing volume or onto the printing platform, a volume of a coagulation agent, such as a coagulant, a non-solvent, variations thereof, or combinations thereof, can be disposed, such as by an aerosol sprayer or other suitable dispensing mechanism, to a volume directly adjacent the disposed ink. Without wishing to be bound by any particular theory, the coagulation agent can cause partial, substantially complete, or complete coagulation, solidification, polymerization, phase inversion, cross-linking, crystallization, calcification, concretion, setting, stiffening, hardening, amalgamation, strengthening, gelation, congealing, thickening, densification, annealing, shaping, forming, clotting, variations thereof, combinations thereof, or the like. As such, a first volume of ink can be printed, e.g., by a nozzle or the like, in a freeform manner directly into air and partially or fully solidified by disposing a first volume of the coagulation agent sufficiently close by the printed ink, the nozzle can move a distance, in a particular direction, from the previous printing location and print a second volume of ink, e.g., adjacent the first volume of ink (now partially or fully solidified), dispose a second volume of the coagulation agent to partially or fully solidify the second volume of ink, and continue along a predetermined path through the printing volume or across the printing platform in order to completely print an intermediate or finished article without being required to melt the build material, without using support structures, and/or without using a support bath or the like to maintain the structure of the printed article prior to completion of printing of the article. In some embodiments, an intermediate article may be one in which some or all of the article is only partially solidified or for which further processing is helpful or required to achieve the finished article.

In some embodiments, if an intermediate article is formed for which some or all of the liquid build material only partially coagulates, heat, a chemical reactant, electromagnetic radiation, and/or the like may be used to fully solidify or otherwise process the intermediate article to form the finished article.

In some embodiments, a method for three-dimensional printing of a printed article can comprise forming a liquid build material, the liquid build material comprising a polymeric material in a solvent; disposing the liquid build material into a volume of air; and spraying a nebulized coagulation agent within a predetermined distance of the disposed liquid build material to at least partially coagulate the liquid build material, thereby forming the article. In some embodiments, spraying the nebulized coagulation agent within the predetermined distance of the disposed liquid build material is done within a predetermined time following the disposing the liquid build material into the volume of air. In some embodiments, spraying the nebulized coagulation agent within the predetermined distance of the disposed liquid build material within the predetermined time following the disposing the liquid build material into the volume of air only partially coagulates the liquid build material. As such, in some embodiments, the method can further comprise, in an instance in which spraying the nebulized coagulation agent within the predetermined distance of the disposed liquid build material only partially coagulates the liquid build material, exposing the intermediate article to a post-printing coagulation solution to fully solidify the intermediate article, forming the finished article. In some embodiments, exposing the intermediate article to the post-printing coagulation solution comprises submerging the intermediate article in a bath of the post-printing coagulation solution. In some embodiments, the method further comprises dissolving the polymeric material in the solvent to form the liquid build material. In some embodiments, at least one of the forming, the disposing, the spraying, or the exposing is carried out by an apparatus comprising one or more reservoirs configured to contain a supply of the liquid build material, a nozzle, and a computing device. In some embodiments, the nozzle is configured and dimensioned to move along a predetermined path within the volume of air to dispose a volume of the liquid build material. In some embodiments, the predetermined path is determined by the computing device based upon an input design file comprising a design of the finished article. In some embodiments, the apparatus is configured to communicate the liquid build material from the reservoir, through the nozzle, and into the volume of air. In some embodiments, the intermediate article is formed free of printed support structures.

In some embodiments, the method can further comprise, optionally, dissolving a polymeric material in a solvent to form the build material (e.g., "the liquid build material," "the ink," or "the polymeric solution"). In some embodiments, the build material can comprise any suitable polymeric material such as a thermoplastic. In some embodiments, a polymeric material can be dissolved or dispersed in any suitable solvent. In some embodiments, such a solvent can comprise dimethyl sulfoxide (DMSO), and/or the like. In some embodiments, to form the build material, the polymeric material can be dissolved in the solvent partially or fully, at about room temperature (about 20° C. to about 25° C.), or at an elevated temperature, while being stirred, shaken, agitated, bombarded with electromagnetic radiation and/or ultrasonic sound waves, or the like. In some embodiments, one or more solvents can be chosen that are capable of breaking down the build material without causing molecular degradation or a reduction in the degree of polymerization (DP). Conventional additive manufacturing and 3D printing techniques for polymeric materials typically requires melting the polymeric material at least partially if not fully to facilitate the communication and build-up of the article using the polymeric material. These conventional additive manufacturing and 3D printing techniques for polymeric materials can require high heat, which can make the process costly, dangerous, time-consuming, and limiting in terms of the reusability of printing materials. By contrast, the room temperature process according to some embodiments described herein requires no heating of the printing materials, no thermal deterioration of the polymers, and can eliminate the process step from conventional additive manufacturing and 3D printing methods of heating and/or melting the polymeric material.

According to another embodiment, a method can be provided for 3D printing an article that comprises: disposing a first volume of a liquid build material onto a substrate; within a predetermined time following disposing the first volume of the liquid build material onto the substrate, spraying a first volume of a nebulized coagulation agent within a predetermined distance of the disposed first volume of the liquid build material to at least partially coagulate the first volume of the first volume of the liquid build material; disposing a second volume of the liquid build material onto at least a portion of the at least partially coagulated first volume of the liquid build material; and within the predetermined time following disposing the second volume of the liquid build material onto at least the portion of the at least partially coagulated first volume of the liquid build material, spraying a second volume of the nebulized coagulation agent within the predetermined distance of the disposed second volume of the liquid build material to at least partially coagulate the second volume of the liquid build material. In some embodiments, in an instance in which spraying the first volume and the second volume of the nebulized coagulation agent within the predetermined distance of the disposed first and second volumes of the liquid build material only partially coagulates the first and second volumes of the liquid build material, the method can further comprise: exposing the article to a post-printing coagulation solution to fully solidify the article. In some embodiments, exposing the article to the post-printing coagulation solution comprises submerging the article in a bath of the post-printing coagulation solution. In some embodiments, the liquid build material comprises at least one polymeric material and at least one solvent. In some embodiments, the method can be carried out by an apparatus comprising one or more reservoirs configured to contain a supply of the liquid build material, a nozzle, and a computing device. In some embodiments, the nozzle is configured and dimensioned to move along a predetermined path within the volume of air to dispose a volume of the liquid build material. In some embodiments, the predetermined path is determined by the computing device based upon an input design file comprising a design of the finished article. In some embodiments, the apparatus can be configured to communicate the liquid build material from the reservoir, through the nozzle, and into the volume of air.

As such, according to another embodiment, an apparatus can be provided for 3D printing a finished article. In some embodiments, the apparatus can comprise: a printing space comprising an air-filled inner volume and a printing substrate; a reservoir configured to contain a supply of a liquid build material; a nozzle coupled to the reservoir and configured to dispose a volume of the liquid build material into the air-filled inner volume of the printing space; a nebulizer configured to nebulize a coagulation agent and disperse the nebulized coagulation agent within a predetermined distance of the disposed volume of liquid build material to at least partially coagulate the disposed volume of liquid build material; and a computing device configured to control movement of the nozzle and the disposing of the volume of the liquid build material into the air-filled inner volume of the printing space. In some embodiments, the nebulized coagulation agent may only partially coagulate the disposed volume of liquid build material to form an intermediate article. As such, in some embodiments, the apparatus can further comprise, optionally, a solidification bath comprising a coagulation solution, the solidification bath configured to, in an instance in which the nebulized coagulation agent only partially coagulates the disposed volume of liquid build material, receive the intermediate article and cause, via the coagulation fluid, the intermediate article to fully solidify, thereby forming the finished article.

In some embodiments, the build material can comprise a polymeric material, such as at least one from among thermoplastic polymer, thermosetting polymers, acrylonitrile-butadiene-styrene, polyurethane, acrylic, poly(acrylonitrile), polyolefins, polyvinyl chlorides, nylons, fluorocarbons, polystyrenes, polyethylene, ultra-high molecular weight polyethylene, polypropylene, polybutene, polymethylpentene, polyisoprene, copolymers thereof, and their combinations, mixtures containing two or more of the following polyethylene, ultra-high molecular weight polyethylene, and polypropylene, as well as, mixtures of the foregoing with copolymers such as ethylene-butene copolymers and ethylene-hexene copolymers, thermosetting plastics, such as polyimide (PI), poly amide (PA), and poly amide imide (PAI), polypropylene (PP), polyethylene (PE), ethylene vinylacetate (EVA), poly(ethylene terephthalate) (PET), poly(vinyl acetate) (PVA), polyamide (PA), acrylic adhesives, ultraviolet (UV)/electron beam (EB)/infrared (IR) curable resin, polyether ether ketone (PEEK), polyethylene naphthalate (PEN), polyethersulfone (PES), polyphenylene sulfide (PPS), polyphenylene oxide (PPO), combinations thereof, and/or the like.

In some embodiments, the solvent can comprise at least one from among dimethyl sulfoxide (DMSO), dimethylformamide (DMF), acetonitrile, ethanol, combinations thereof, and/or the like.

In some embodiments, such as when the nebulized coagulation agent only partially coagulates the liquid build material to form an intermediate part, the intermediate part can be immersed, submerged, dipped, sprayed with, coated with, or otherwise exposed to a coagulation solution to fully solidify the intermediate part into the finished article. The coagulation solution can comprise any suitable material, for instance one or more of water, deionized water, ethanol, or the like.

It should be appreciated that all combinations of the foregoing concepts and additional concepts discussed in greater detail below (provided such concepts are not mutually inconsistent) are contemplated as being part of the inventive subject matter disclosed herein. In particular, the combinations of claimed subject matter appearing at the end of this disclosure are contemplated as being part of the inventive subject matter disclosed herein. It should be appreciated that terminology explicitly employed herein that also may appear in any disclosure incorporated by reference should be accorded a meaning consistent with the particular concepts disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIG. 5 provides a process flow diagram of a method of 3D printing, according to an embodiment of the present disclosure.

FIG. 6 provides a process flow diagram of a method of 3D printing, according to an embodiment of the present disclosure.

DETAILED DESCRIPTION

Figure 1:
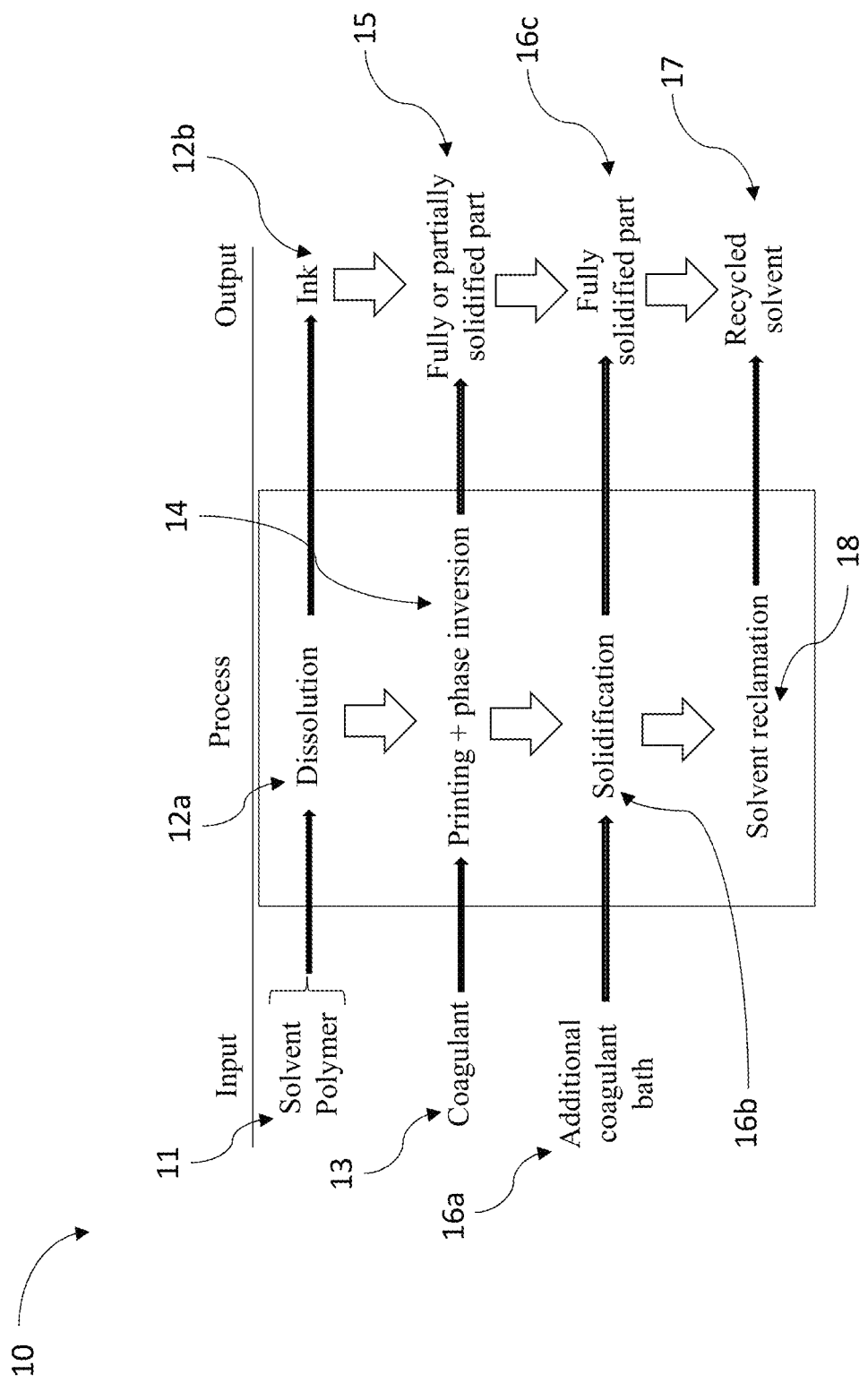
FIG. 1 provides a process flow diagram of a method for three-dimensional (3D) printing, according to an embodiment of the present disclosure.

Various embodiments of the present disclosure will now be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout.

As used herein, the terms "instructions," "file," "designs," "data," "content," "information," and similar terms may be used interchangeably, according to some example embodiments of the present invention, to refer to data capable of being transmitted, received, operated on, displayed, and/or stored. Thus, use of any such terms should not be taken to limit the spirit and scope of the disclosure. Further, where a computing device is described herein to receive data from another computing device, it will be appreciated that the data may be received directly from the other computing device or may be received indirectly via one or more computing devices, such as, for example, one or more servers, relays, routers, network access points, base stations, and/or the like.

As used herein, the term "computer-readable medium" as used herein refers to any medium configured to participate in providing information to a processor, including instructions for execution. Such a medium may take many forms, including, but not limited to a non-transitory computer-readable storage medium (for example, non-volatile media, volatile media), and transmission media. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Examples of non-transitory computer-readable media include a floppy disk, a flexible disk, hard disk, magnetic tape, any other non-transitory magnetic medium, a compact disc read only memory (CD-ROM), compact disc compact disc-rewritable (CD-RW), digital versatile disc (DVD), Blu-Ray, any other non-transitory optical medium, punch cards, paper tape, optical mark sheets, any other physical medium with patterns of holes or other optically recognizable indicia, a random access memory (RAM), a programmable read only memory (PROM), an erasable programmable read only memory (EPROM), a FLASH-EPROM, any other memory chip or cartridge, a carrier wave, or any other non-transitory medium from which a computer can read. The term computer-readable storage medium is used herein to refer to any computer-readable medium except transmission media. However, it will be appreciated that where embodiments are described to use a computer-readable storage medium, other types of computer-readable mediums may be substituted for or used in addition to the computer-readable storage medium in alternative embodiments. By way of example only, a design file for a printed article may be stored on a computer-readable medium and may be read by a computing device, such as described hereinbelow, for controlling part or all of a 3D printing process and associated apparatuses and components, according to various embodiments described herein.

As used herein, the term "circuitry" refers to all of the following: (a) hardware-only circuit implementations (such as implementations in only analog and/or digital circuitry); (b) to combinations of circuits and computer program product(s) comprising software (and/or firmware instructions stored on one or more computer readable memories), such as (as applicable): (i) to a combination of processor(s) or (ii) to portions of processor(s)/software (including digital signal processor(s)), software, and memory(ies) that work together to cause an apparatus, such as a mobile phone or server, to perform various functions described herein); and (c) to circuits, such as, for example, a microprocessor(s) or a portion of a microprocessor(s), that require software or firmware for operation, even if the software or firmware is not physically present. This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, other network device, and/or other computing device.

As used herein, the term "computing device" refers to a specialized, centralized device, network, or system, comprising at least a processor and a memory device including computer program code, and configured to provide guidance or direction related to the charge transactions carried out in one or more charging networks.

As used herein, the terms "about," "substantially," and "approximately" generally mean plus or minus 10% of the value stated, e.g., about 250 μm would include 225 μm to 275 μm, about 1,000 μm would include 900 μm to 1,100 μm. Any provided value, whether or not it is modified by terms such as "about," "substantially," or "approximately," all refer to and hereby disclose associated values or ranges of values thereabout, as described above.

Additive manufacturing, also referred to as three-dimensional (3D) printing, encompasses a range of technologies used to fabricate parts by building material up rather than by subtracting unwanted material away from a bulk starting workpiece. Conventionally, printed parts are formed using 3D printing by depositing and/or solidifying a build material layer-by-layer in computer-controlled patterns generated from a digital part model; each layer forms a thin slice of the complete part and the layers are integrated to form a tangible part based at least in part on the digital model. Another conventional 3D printing technique is fused deposition modeling (FDM), a widely implemented type of 3D printing, in which a thermoplastic build material in the form of a filament is melted and extruded from a hot tip to generate 3D parts layer-by-layer in a controlled spatial pattern; as in other 3D printing processes, the part is first generated as a computer model, then transformed into commands for a printer. FDM can be used for fabricating prototypes and products from rigid thermoplastic polymer materials, such as poly(lactic acid) (PLA) and acrylonitrile-butadiene-styrene (ABS).

Additive manufacturing is a powerful tool for production and prototyping using a wide range of materials. Conventional 3D printing methods, for instance conventional FDM methods, may be suitable for a limited range of polymeric materials and geometries, however there are many articles, materials, and production scenarios for which using such conventional 3D printing approaches compromises article printing precision, article mechanical properties, and/or the cost/time associated with production.

For many or most conventional 3D printing methods, such as FDM, the thermoplastic properties of polymer materials at moderately or highly elevated temperatures is key to their successful implementation. Unfortunately, some engineering polymers may require high temperature to be plastic for FDM printing. For example, polyether ether ketone (PEEK) has a melting point of 343° C., which may be difficult to be implemented. For some applications, the thermal gradient during high-temperature FDM printing might be undesirable as it may induce material degradation due to the thermal stress. In addition, the thermal residual stresses within printed parts may result in warpage and other defects. As the demand of customized polymer parts keeps growing, there is a critical need to develop alternative polymer printing process that can overcome the aforementioned temperature-related setbacks.

Typically, since conventional 3D printing methods such as FDM methods involve melting the 3D printing/build material to enable iterative, layered deposition, the high heat required for melting the printing/build materials (typically a polymer) may result in thermal damage to the polymer (molecular degradation) as well as undesirable thermal residual stress. For instance, certain polymeric materials such as non-thermoplastic polymers may degrade upon heating instead of melting. Thus, these materials cannot or should not be melt processed. Other materials are difficult to handle in the filament form necessary for conventional FDM since they are prone to damage from the feed mechanism, stretching, distortion, and irregular flow; all of which can result in inconsistent printing performance and unpredictable part properties. Other drawbacks of FDM and other methods can include, but are not limited to, elevated energy consumption, limitations with regard to material selection, and residual thermal stress. Also, it can sometimes be difficult to FDM print high-temperature engineering polymers. For instance, even if high temperature plasticity is achievable for most polymers, the thermal residual stress within FDM parts is typically a concern. Such thermal residual stress within FDM parts may be a result of thermal gradients between individual deposited layers and between the printed part and its surroundings. Oftentimes, such thermal residual stress can lead to deformation of an FDM part, can lead to deficient mechanical properties, can reduce the mechanical, optical, thermal, radiative, and/or chemical stability of the FDM part, and/or can lead to aesthetic and/or operability issues. Such deficiencies and issues may present themselves at some time after FDM printing of the FDM part, or may present themselves, alone or in combination with other issues, sometime after FDM printing, such as after some amount of use of the part or after some exposure of the FDM part to an environmental or a man-made stimulus.

Additionally, undesirable surface and interface characteristics at the interface between two neighboring filaments or layers may reduce the mechanical strength and other mechanical properties of the finished article. As such, FDM often results in a finished part that has reduced internal mechanical strength, which can lead to a reduction in the overall mechanical properties of the FDM printed part or portions thereof.

Furthermore, current FDM technology generally requires the use of a temporary support material which is printed alongside the part to ensure that overhanging regions and other details remain intact, especially for soft polymer build materials but also often for other build materials. This requirement for support structures to be concurrently printed with the finished article increases the complexity of the printing machinery since it must handle multiple materials, the complexity of the code to appropriately deposit the support material, the fabrication time since switching heads and printing support structures are both time consuming, and the post-processing time since the support material must be removed after printing is complete. Thus, a more robust methodology for 3D printing engineering polymers including soft and/or non-thermoplastic materials is of great interest. It is desired that this process be implementable in ambient conditions to avoid thermal residual stress on the printed article, minimize interfaces between filaments or layers, and reduce the use of printed support structures to maximize fabrication efficiency.

Other approaches, such as those described in U.S. patent application Ser. Nos. 16/703,686 and 16/707,087, the entire disclosure of each of which are hereby incorporated herein by reference in their entireties, may rely upon a yield-stress support bath, in to which a polymeric ink is injected such that the ink retains its form during printing. However, the use of a semi-solid or viscous liquid, such as a yield-stress support bath or the like, into which ink is printed, may be a relatively slow process, may require the use of a lot of materials during printing, may require additional steps or materials (e.g., preparing the yield-stress support bath using materials specifically chosen to be chemically suitable to support the ink being used, transferring the yield-stress support bath into a coagulation bath before the printed part can be removed, and the like), often requires the addition of a rheological modifier to the ink or the support bath, and/or may be limited with regard to the polymer/solvent combinations that are possible based on the chemistry and rheology of a support bath. As such, there is a desire for more rapid, more flexible, and less material intensive freeform printing of 3D polymer articles.

Thus, the inventors have conceived of and diligently reduced to practice multiple embodiments of a method and an associated apparatus for three-dimensional (3D) printing that enables freeform fabrication of printed structures and articles. According to some embodiments, such freeform fabrication can be carried out under ambient conditions. According to these and/or other embodiments, such freeform fabrication can be carried out without the use of support structures (e.g., printed support structures, solid support structures, support structures that are inherent to the printed article or the printing platform, support structures that should or must be removed after printing and before the printed article is ready for use, and/or the like). According to some embodiments, a build material (e.g., a polymeric material) can be dissolved in a solvent, a solvent mixture, or a mixture of solvent(s) with non-solvents (e.g., a rheological modifier and/or the like) for printing according to a variety of possible printing methods (e.g., extrusion, injection, etc.) within an air-filled volume.

In some embodiments, a solvent-assisted printing process is provided for directly printing polymers at room temperature. In some embodiments, the solvent-assisted printing process can include dissolving a polymeric material in a solvent or the like for use as an ink for printing. In some embodiments, the solvent-assisted printing process can further include printing the resulting ink directly in air at room temperature in an enclosed chamber using a proper dispensing mechanism while a coagulant/non-solvent is delivered to the part being printed that partially solidifies the part. Without wishing to be bound by any particular theory, solidification may occur in the presence of the proper coagulant/non-solvent or mixture thereof due to a phase inversion mechanism. In other embodiments, without wishing to be bound by any particular theory, the coagulation agent can cause partial, substantially complete, or complete coagulation, solidification, polymerization, phase inversion, cross-linking, crystallization, calcification, concretion, setting, stiffening, hardening, amalgamation, strengthening, gelation, congealing, thickening, densification, annealing, shaping, forming, clotting, variations thereof, combinations thereof, or the like. In some embodiment, if needed, the printed part can be post-processed in a solidification bath or the like for complete solidification. In some embodiments, the consumed solvent can be reclaimed for recycling and reuse. By way of example only, acrylonitrile-butadiene-styrene (ABS) can be dissolved in dimethyl sulfoxide (DMSO) and the resulting ABS-DMSO mixture solution (e.g., the "ink") can be extruded in air while a volume of water is delivered as a coagulant using a nebulizer. In some embodiments, after printing, the part can be submerged into a water bath for further or complete solidification. In some embodiments, the part can then be removed from the water-based solidification bath and dried at room temperature while the residual solvent can be reclaimed from the water-based solidification bath, e.g., through a distillation process. In some embodiments, continuous conduits, shells, bulky parts, complex parts, hollow parts, and the like can be printed according to a solvent-enabled direct printing in air method. While extrusion is used as the printing modality described in most embodiments of the present disclosure, the build material/solvent mixture solution can also be printed using other applicable printing modalities including but not limited to inkjetting or the like.

The build material/solvent solution (which is also referred to interchangeably herein as the "ink," the "printing mixture," the "printing medium," the "polymer mixture," and the "polymer solution,") can be printed directly into air without the use of solid or liquid support, such as concurrently printed solid supports or a yield-stress support bath, thereby forming an entire 3D part in air without heating the build material during printing, without requiring the printed build material to cool, and without requiring the use of solid or liquid supports during printing of the article/part, which typically need to be removed after printing. After printing, the printed article can be immersed in a post-printing coagulation solution to solidify the printed polymer material, thereby forming the solid printed article/part.

In some embodiments, 3D printed structures and articles may be fabricated under ambient conditions and/or without the use of printed support structures which would need to be removed after 3D printing in order to achieve the finished structure or article. In some embodiments, a build material can be dissolved in a suitable solvent or solvent solution (e.g., solvent/non-solvent mixture) such that the resulting solution is a suitable ink for 3D printing. In some embodiments, the build material can comprise one or more polymers or a polymer solution. In some embodiments, the ink, comprising the build material, can be disposed within a printing volume or onto a printing platform without the use of supports or other structures being previously, concurrently, or subsequently printed to support the build material while the build material solidifies. In some embodiments, the method can comprise delivering ink or build material into the printing environment, communicating ink or build material into the printing environment, causing transfer of ink or build material into the printing environment, conveying ink or build material into the printing environment, printing ink or build material into the printing environment, extruding ink or build material into the printing environment, dispersing ink or build material into the printing environment, injecting ink or build material into the printing environment, spraying ink or build material into the printing environment, and/or the like. In some embodiments, the disclosed freeform printing methods and approaches may be carried out at ambient temperature and pressure.

In some embodiments, just previous to, concurrent with, or just following the disposition of ink into the printing volume or onto the printing platform, a volume of a coagulation agent, such as a coagulant, coagulant solution, a non-solvent, variations thereof, or combinations thereof, can be disposed, such as by an aerosol sprayer or other suitable dispensing mechanism, to a location, point, or volume about, e.g., directly adjacent to, the disposed ink. In some embodiments, the method can comprise delivering coagulation agent into the printing environment, communicating coagulation agent into the printing environment, causing transfer of coagulation agent into the printing environment, conveying coagulation agent into the printing environment, printing coagulation agent into the printing environment, extruding coagulation agent into the printing environment, dispersing coagulation agent into the printing environment, injecting coagulation agent into the printing environment, spraying coagulation agent into the printing environment, and/or the like.

Without wishing to be bound by any particular theory, the coagulation agent can cause partial, substantially complete, or complete coagulation, solidification, polymerization, phase inversion, cross-linking, crystallization, calcification, concretion, setting, stiffening, hardening, amalgamation, strengthening, gelation, congealing, thickening, densification, annealing, shaping, forming, clotting, variations thereof, combinations thereof, or the like. As such, a first volume of ink can be printed, e.g., by a nozzle or the like, in a freeform manner directly into air and partially or fully solidified by disposing a first volume of the coagulation agent sufficiently close by the printed ink, the nozzle can move a distance, in a particular direction, from the previous printing location and print a second volume of ink, e.g., adjacent the first volume of ink (now partially or fully solidified), dispose a second volume of the coagulation agent to partially or fully solidify the second volume of ink, and continue along a predetermined path through the printing volume or across the printing platform in order to completely print an intermediate or finished article without being required to melt the build material, use support structures, or use a support bath or the like to maintain the structure of the printed article prior to completion of printing of the article. In some embodiments, an intermediate article may be one in which some or all of the article is only partially solidified or for which further processing is helpful or required to achieve the finished article.

In some embodiments, if an intermediate article is formed, heat, a chemical reactant, electromagnetic radiation, and/or the like may be used to fully solidify or otherwise process the intermediate article to form the finished article.

In some embodiments, a method for three-dimensional printing of a printed article can comprise forming a liquid build material, the liquid build material comprising a polymeric material in a solvent; disposing the liquid build material into a volume of air; and spraying a nebulized coagulation agent within a predetermined distance of the disposed liquid build material to at least partially coagulate the liquid build material, thereby forming the article. In some embodiments, spraying the nebulized coagulation agent within the predetermined distance of the disposed liquid build material is done within a predetermined time following the disposing the liquid build material into the volume of air. In some embodiments, spraying the nebulized coagulation agent within the predetermined distance of the disposed liquid build material within the predetermined time following the disposing the liquid build material into the volume of air only partially coagulates the liquid build material, the method further comprising: exposing the intermediate article to a post-printing coagulation solution to fully solidify the intermediate article, forming the finished article. In some embodiments, exposing the intermediate article to the post-printing coagulation solution comprises submerging the intermediate article in a bath of the post-printing coagulation solution. In some embodiments, the method further comprises dissolving the polymeric material in the solvent to form the liquid build material. In some embodiments, at least one of the forming, the disposing, the spraying, or the exposing is carried out by an apparatus comprising one or more reservoirs configured to contain a supply of the liquid build material, a nozzle, and a computing device. In some embodiments, the nozzle is configured and dimensioned to move along a predetermined path within the volume of air to dispose a volume of the liquid build material. In some embodiments, the predetermined path is determined by the computing device based upon an input design file comprising a design of the finished article. In some embodiments, the apparatus is configured to communicate the liquid build material from the reservoir, through the nozzle, and into the volume of air. In some embodiments, the intermediate article is formed free of printed support structures.

In some embodiments, the method can further comprise, optionally, dissolving a polymeric material in a solvent to form the build material (e.g., "the liquid build material," "the ink," or "the polymeric solution"). In some embodiments, the build material can comprise any suitable polymeric material such as a thermoplastic. In some embodiments, a polymeric material can be dissolved or dispersed in any suitable solvent. In some embodiments, such a solvent can comprise dimethyl sulfoxide (DMSO), and/or the like. In some embodiments, to form the build material, the polymeric material can be dissolved in the solvent partially or fully, at about room temperature (about 20° C. to about 25° C.), or at an elevated temperature, while being stirred, shaken, agitated, bombarded with electromagnetic radiation and/or ultrasonic sound waves, or the like. In some embodiments, one or more solvents can be chosen that are capable of breaking down the build material without causing molecular degradation or a reduction in the degree of polymerization (DP). Conventional additive manufacturing and 3D printing techniques for polymeric materials typically requires melting the polymeric material at least partially if not fully to facilitate the communication and build-up of the article using the polymeric material. These conventional additive manufacturing and 3D printing techniques for polymeric materials can require high heat, which can make the process costly, dangerous, time-consuming, and limiting in terms of the reusability of printing materials. By contrast, the room temperature process according to some embodiments described herein requires no heating of the printing materials, no thermal deterioration of the polymers, and can eliminate the process step from conventional additive manufacturing and 3D printing methods of heating and/or melting the polymeric material.

According to another embodiment, a method can be provided for 3D printing an article that comprises: disposing a first volume of a liquid build material onto a substrate; within a predetermined time following disposing the first volume of the liquid build material onto the substrate, spraying a first volume of a nebulized coagulation agent within a predetermined distance of the disposed first volume of the liquid build material to at least partially coagulate the first volume of the first volume of the liquid build material; disposing a second volume of the liquid build material onto at least a portion of the at least partially coagulated first volume of the liquid build material; and within the predetermined time following disposing the second volume of the liquid build material onto at least the portion of the at least partially coagulated first volume of the liquid build material, spraying a second volume of the nebulized coagulation agent within the predetermined distance of the disposed second volume of the liquid build material to at least partially coagulate the second volume of the liquid build material. In some embodiments, spraying the first volume and the second volume of the nebulized coagulation agent within the predetermined distance of the disposed first and second volumes of the liquid build material only partially coagulates the liquid build material, the method further comprising: exposing the article to a post-printing coagulation solution to fully solidify the article. In some embodiments, exposing the article to the post-printing coagulation solution comprises submerging the article in a bath of the post-printing coagulation solution. In some embodiments, the liquid build material comprises at least one polymeric material and at least one solvent. In some embodiments, the method can be carried out by an apparatus comprising one or more reservoirs configured to contain a supply of the liquid build material, a nozzle, and a computing device. In some embodiments, the nozzle is configured and dimensioned to move along a predetermined path within the volume of air to dispose a volume of the liquid build material. In some embodiments, the predetermined path is determined by the computing device based upon an input design file comprising a design of the finished article. In some embodiments, the apparatus can be configured to communicate the liquid build material from the reservoir, through the nozzle, and into the volume of air.

As such, according to another embodiment, an apparatus can be provided for 3D printing a finished article. In some embodiments, the apparatus can comprise: a printing space comprising an air-filled inner volume and a printing substrate; a reservoir configured to contain a supply of a liquid build material; a nozzle coupled to the reservoir and configured to dispose a volume of the liquid build material into the air-filled inner volume of the printing space; a nebulizer configured to nebulize a coagulation agent and disperse the nebulized coagulation agent within a predetermined distance of the disposed volume of liquid build material to at least partially coagulate the disposed volume of liquid build material; and a computing device configured to control movement of the nozzle and the disposing of the volume of the liquid build material into the air-filled inner volume of the printing space. In some embodiments, the nebulized coagulation agent may only partially coagulate the disposed volume of liquid build material to form an intermediate article. As such, in some embodiments, the apparatus can further comprise, optionally, a solidification bath comprising a coagulation fluid, the solidification bath configured to receive the intermediate article, the coagulation fluid operable to fully solidify the article, if needed, thereby forming the finished article.

In some embodiments, the build material can comprise a polymeric material, such as at least one from among thermoplastic polymer, thermosetting polymers, acrylonitrile-butadiene-styrene, polyurethane, acrylic, poly(acrylonitrile), polyolefins, polyvinyl chlorides, nylons, fluorocarbons, polystyrenes, polyethylene, ultra-high molecular weight polyethylene, polypropylene, polybutene, polymethylpentene, polyisoprene, copolymers thereof, and their combinations, mixtures containing two or more of the following polyethylene, ultra-high molecular weight polyethylene, and polypropylene, as well as, mixtures of the foregoing with copolymers such as ethylene-butene copolymers and ethylene-hexene copolymers, thermosetting plastics, such as polyimide (PI), poly amide (PA), and poly amide imide (PAI), polypropylene (PP), polyethylene (PE), ethylene vinylacetate (EVA), poly(ethylene terephthalate) (PET), poly(vinyl acetate) (PVA), polyamide (PA), acrylic adhesives, ultraviolet (UV)/electron beam (EB)/infrared (IR) curable resin, polyether ether ketone (PEEK), polyethylene naphthalate (PEN), polyethersulfone (PES), polyphenylene sulfide (PPS), polyphenylene oxide (PPO), combinations thereof, and/or the like.

In some embodiments, the solvent can comprise at least one from among dimethyl sulfoxide (DMSO), dimethylformamide (DMF), acetonitrile, ethanol, combinations thereof, and/or the like.

In some embodiments, such as when the nebulized coagulation agent only partially coagulates the liquid build material to form an intermediate part, the intermediate part can be immersed, submerged, dipped, sprayed with, coated with, or otherwise exposed to a coagulation solution to fully solidify the intermediate part into the finished article. The coagulation solution can comprise any suitable material, for instance one or more of water, deionized water, ethanol, or the like.

Referring now to FIG. 1, a process 10 is described for room-temperature polymer printing of polymeric structures, directly in air, without needing to heat the polymer build materials to a plastic state. According to some embodiments, the process 10 comprises providing a solvent-polymer mixture 11 suitable for dissolution 12a of the polymer in the solvent to form the ink 12b (e.g., "the build material"). In some embodiments, the process 10 further comprises depositing the ink 12b into a printing environment in the presence of a coagulant 13, resulting in coagulation, e.g., due to phase inversion, and self-supported printing 14 of the ink 12b. In some embodiments, the ink 12b is deposited in air in the form of viscous filaments or droplets while a coagulation agent/non-solvent 13, e.g., a coagulation agent or non-solvent having a higher Hansen solubility/affinity value with the solvent of the ink 12b than that of the polymer has, can be delivered simultaneously in the enclosed printing environment, e.g., a 3D printing chamber. The coagulant 13 can cause partial or full coagulation of the ink 12b during printing 14, resulting in formation of the partially or fully solidified part 15. In an instance in which the partially or fully solidified part 15 is only partially solidified after exposure to the coagulant 13, the process 10 can further comprise exposing the partially solidified part 15 to a post-printing solidification bath 16a in order to remove solvent out of polymer parts completely, causing full solidification 16b of the part, thereby forming the fully solidified part 16c. In some embodiments, once the fully solidified part 16c is printed and solidified in the post-printing solidification bath 16a, the fully solidified part 16c can be removed from the post-printing solidification bath 16a, and the solvent can be recycled 17 from the printing environment and/or the post-printing solidification bath 16a and reclaimed 18 for reuse during subsequent 3D printing processes. The recycling 17 process can comprise removing all liquid from the printing environmental and/or the post-printing solidification bath and the reclamation 18 process can comprise a distillation process whereby materials are separated based upon the temperature at which phase change occurs which is inherent between different materials.

As compared to conventional 3D polymer printing technologies such as FDM, the described 3D printing processes and methods, and associated systems, apparatuses, and computer program products, have at least the following advantages: 1) no required size or form of raw polymer materials. 2) no pre-heating process and room-temperature printing, and 3) reduced energy consumption (e.g., for heating).

As described herein, 3D extrusion printing of various polymer parts in air has been successfully carried out to demonstrate the technology feasibility. In some embodiments, suitable materials can include but are not limited to: acrylonitrile butadiene styrene (ABS) as a build polymer, dimethyl sulfoxide (DMSO) as a solvent, and water as a coagulation agent; the residual solvent in the post-printing solidification bath is reclaimed using distillation.

According to other embodiments, a polymer printing process can be provided that comprises dissolving a polymer build material with a suitable solvent in order to obtain a homogeneous ink solution for printing, using an applicable 3D printer (e.g., extrusion-based, inkjetting-based, etc.). In some embodiments, the ink can be dispensed in a filament or droplet form for layer-by-layer deposition. In some embodiments, the printing process can be carried in an enclosed chamber (e.g., "printing environment") to collect any solvent from the solvent-containing ink that is released during at least partial coagulation of the ink. Simultaneously, a coagulation agent can be delivered to the environment where the polymer part is being printed, partially solidifying deposited features. Without wishing to be bound by any particular theory, the solidification process may be carried out due to or according to a phase inversion, where the solvent is removed from a liquid-polymer solution to solidify the polymer. In some embodiments, the phase inversion process may start on the outer surface of deposited filaments/droplets as this is in direct contact with the active coagulation agent in the printing environment. Once the surface is coagulated, the coagulation front may travel some distance inwards through the filament/droplet through diffusion and remove the solvent out of the printed structure due to the higher affinity between the solvent and the selected coagulation agent. This in-process solidification mechanism may be controlled to occur only partially for a balance of good fusion between two consecutively deposited layers due to unsolidified polymer solution and enough strength to hold a printed structure in air due to solidified polymer, which may result in the formation of an intermediate part or intermediate article. The printed part may have heterogeneous stiffness right after printing since layers located at the bottom are stiffer due to a higher solidification ratio, which may be a result of the longer exposure to the coagulation agent. For complete solidification throughout the intermediate part, it can be immersed, if needed, in a post-printing solidification bath to fully remove the solvent. In some embodiments, the collected solvent or solvent-containing solution from the printing chamber and/or post-printing solidification bath can be collected, recycled, and/or post-processed in order to reclaim the solvent for reuse, minimizing the cost, material intensity, and environmental impact of 3D printing as compared to conventional 3D printing approaches.

Computer Program Products, Methods, and Computing Entities

Embodiments of the present invention may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid-state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

Exemplary Systems and Apparatuses

Figure 2:
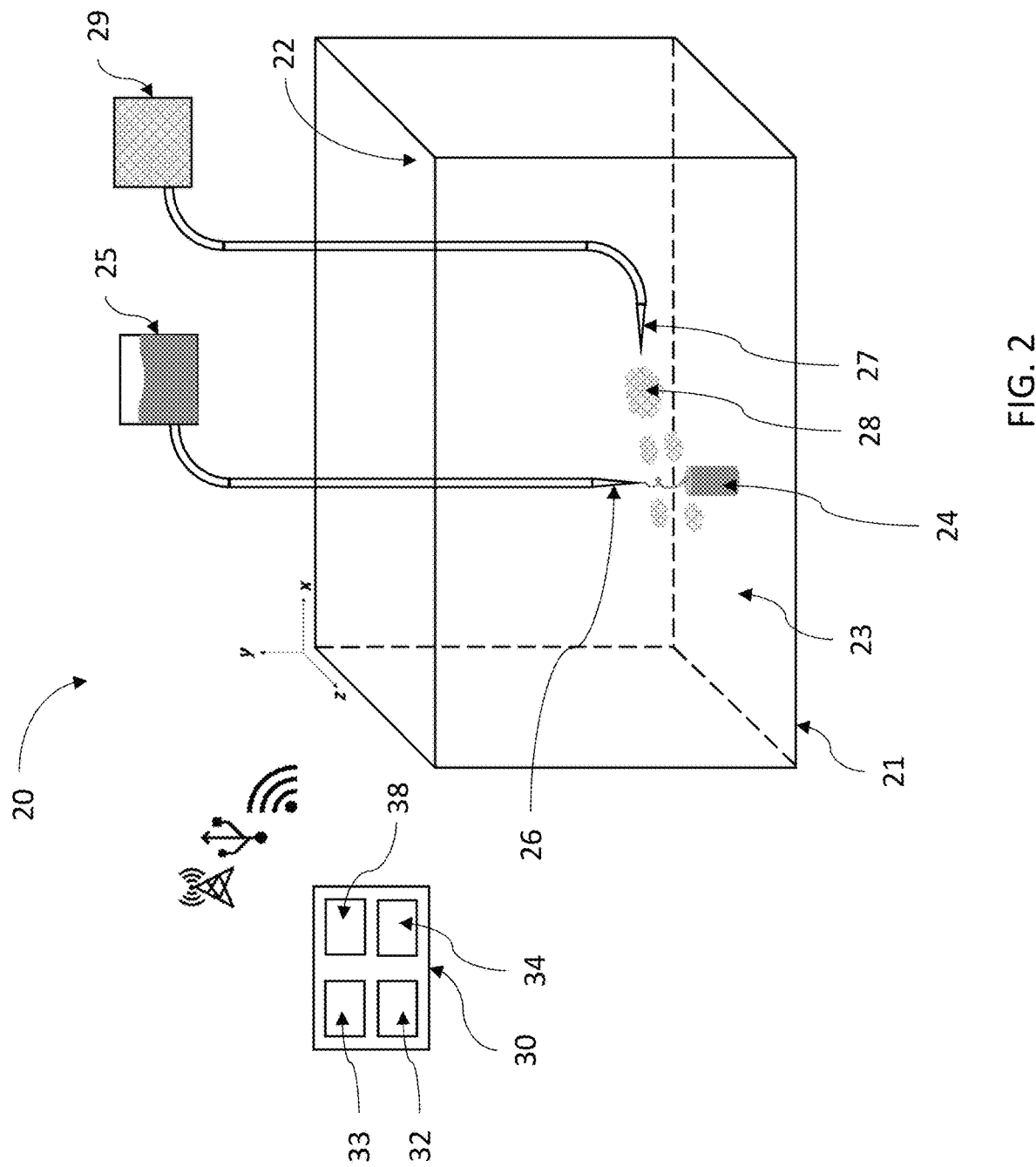
FIG. 2 provides a schematic illustration of an apparatus for 3D printing, according to an embodiment of the present disclosure.

FIG. 2 provides, according to one or more embodiments of the present disclosure, an exemplary apparatus 20 for solvent-assisted polymeric 3D printing at ambient temperature and pressure, without the use of a support bath or solid supports, and without melting the polymeric ink to render the ink plastic for printing. The apparatus 20 comprises a printing environment 21, which may be enclosed or open, but nevertheless defines an inner volume 22 and comprises a printing substrate 23. The apparatus 20 can be operably configured to 3D print a self-supporting article 24 supported on the printing substrate 23 and being self-supporting across a wide degree of article complexities. The apparatus 20 can further comprise a polymeric ink reservoir 25 configured to store a supply of a polymeric ink that comprises one or more solvents and one or more polymeric materials. In some embodiments, the polymeric ink reservoir 25 can be operably coupled to a printing nozzle 26 that is dimensioned and configured to receive, from the polymeric ink reservoir 25, a portion or flow of the polymeric ink. The printing nozzle 26 can be configured to be moved in three dimensions (x, y, and z) within the inner volume 22 of the printing environment 21 and to dispose discrete volumes or continuous flows of the polymeric ink to particular locations within the inner volume 22 that are associated with the self-supporting article 24, as desired. Said otherwise, the printing nozzle 26 can be configured to dispose volumes or a flow of the polymeric ink onto the printing substrate 23 or onto a previously printed portion of the self-supporting article 24, in the inner volume 22, e.g., an air-filled inner volume, and to move in three dimensions such that particular volumes of the polymeric ink are deposited at corresponding particular points and locations such that the dimensions, form factor, and characteristics of the self-supporting article 24, once fully printed, are in line with those desired or in line with an initial design for the self-supporting article 24. To do so, the printing nozzle 26 may be configured to deposits the polymeric ink into the inner volume 22 according to a pre-determined route or printing schedule.

In some embodiments, the apparatus 20 can further comprise a nebulizer 27 configured to nebulize and disperse a coagulation agent 28 within the inner volume 22 of the printing environment 21. The nebulizer 27 can be configured to receive a supply of the coagulation agent 28 from a coagulation agent reservoir 29. In some embodiments, at a predetermined time before, during, or after the printing nozzle 26 deposits the polymeric ink into the inner volume 22, e.g., according to the pre-determined route or printing schedule, the nebulizer 27 can be configured to nebulize a volume of the coagulation agent and disperse the nebulized volume of the coagulation agent nearby the printing nozzle 26 and/or nearby the deposited polymeric ink. In some embodiments, the predetermined time may be selected from a predetermined temporal range on either side of the time at which the polymeric ink is deposited from the printing nozzle 26 into the inner volume 22 at respective particular locations. In some embodiments, "nearby" the printing nozzle 26 or the deposited polymeric ink may refer to a location within a predetermined distance of the printing nozzle 26 or within a predetermined distance of the deposited polymeric ink. In some embodiments, the nebulizer 27 may be configured to disperse the coagulation agent 28, once nebulized, before, during, and after deposition of the polymeric ink such that sufficient interaction with the deposited polymeric ink and the coagulation agent 28, once nebulized, is possible. In some embodiments, the nebulizer 27 may be configured to move in three dimensions (x, y, and z) in concert with or alignment with the movements of the printing nozzle 26. In some embodiments, more than one nozzle, e.g., such as more than one of the printing nozzles 26, and/or more than one nebulizer, e.g., such as more than one of the nebulizer 27, may be concurrently used during printing, such as for printing different portions of a large or complex article, e.g., the self-supporting article 24.

In some embodiments, the apparatus 20 may comprise or be in communication with a computing device 30 that is operable to cause or control one or more of the movements of the printing nozzle 26, the provision of polymeric ink from the polymeric ink reservoir 25 to the printing nozzle 26, the rate of deposition of polymeric ink from the printing nozzle 26, the movements of the nebulizer 27, the provision of the coagulation agent 28 from the coagulation agent reservoir 29 to the nebulizer 27, the rate of nebulization of the coagulation agent 28 by the nebulizer 27, the rate and/or distance of dispersal of the coagulation agent 28 from the nebulizer 27, the commencement or termination of printing and/or nebulization, other similar properties or activities within or about the printing environment 21, combinations thereof, and/or the like.

In some embodiments, the computing device 30 can comprise one or more processing elements 32, one or more non-volatile memories 33, one or more volatile memories 34, and/or one or more transmitter/receivers 38 (e.g., "transceivers 38"). In some embodiments, the computing device 30 is configured to store one or more computer program products, computer program code, a computer-readable media comprising instructions, and/or the like. In some embodiments, the computing device 30 is configured to determine, using a starting position, a manual input, sensors, a geospatial coordinate system, or the like, a current position of the printing nozzle 26, the nebulizer 27, and/or the like. In some embodiments, the computing device 30 is configured to determine, using any suitable means, the current reservoir level of the polymeric ink reservoir 25 and/or the coagulation agent reservoir 29. In some embodiments, the computing device 30 is configured to be in wired or wireless communication, such as via the transceivers 38, with one or more motors (not shown) or the like that are configured to move the printing nozzle 26, the nebulizer 27, or other components of the apparatus 20 within the inner volume 22 of the printing environment 21. In some embodiments, the computing device 30 can be configured to communicate a set of instructions to the one or more motors, or the like, for a series of movements of the printing nozzle 26 within the inner volume 22 of the printing environment 21. In some embodiments, the computing device 30 can provide movement instructions to the one or more motors, or the like, for making a series or sequence of movements of the printing nozzle 26 which are necessary to print the self-supporting article 24 in its entirety. In some embodiments, the computing device 30 can provide movement instructions to the one or more motors, or the like, for making a series or sequence of movements of the nebulizer 27 such that the nebulizer 27 follows the movements of the printing nozzle 26 in order to achieve or maintain a distance between the nebulizer 27 and the printing nozzle 26 that is sufficient to at least partially coagulate the polymeric build material as it is disposed from the printing nozzle 26. In some embodiments, the computing device 30 can provide flow rate instructions, e.g., in conjunction with movement instructions, to one or more of the polymeric ink reservoir 25, the printing nozzle 26, the nebulizer 27, or the coagulation agent reservoir 29 in order for the proper flow rate or discrete volume of polymeric ink or the coagulation agent 28, once nebulized, is disposed or dispersed at a correct corresponding location within the inner volume 22 of the printing environment 21 such that the apparatus 20 can achieve the self-supporting article 24, as desired.

Exemplary Computing Entity

Figure 3:
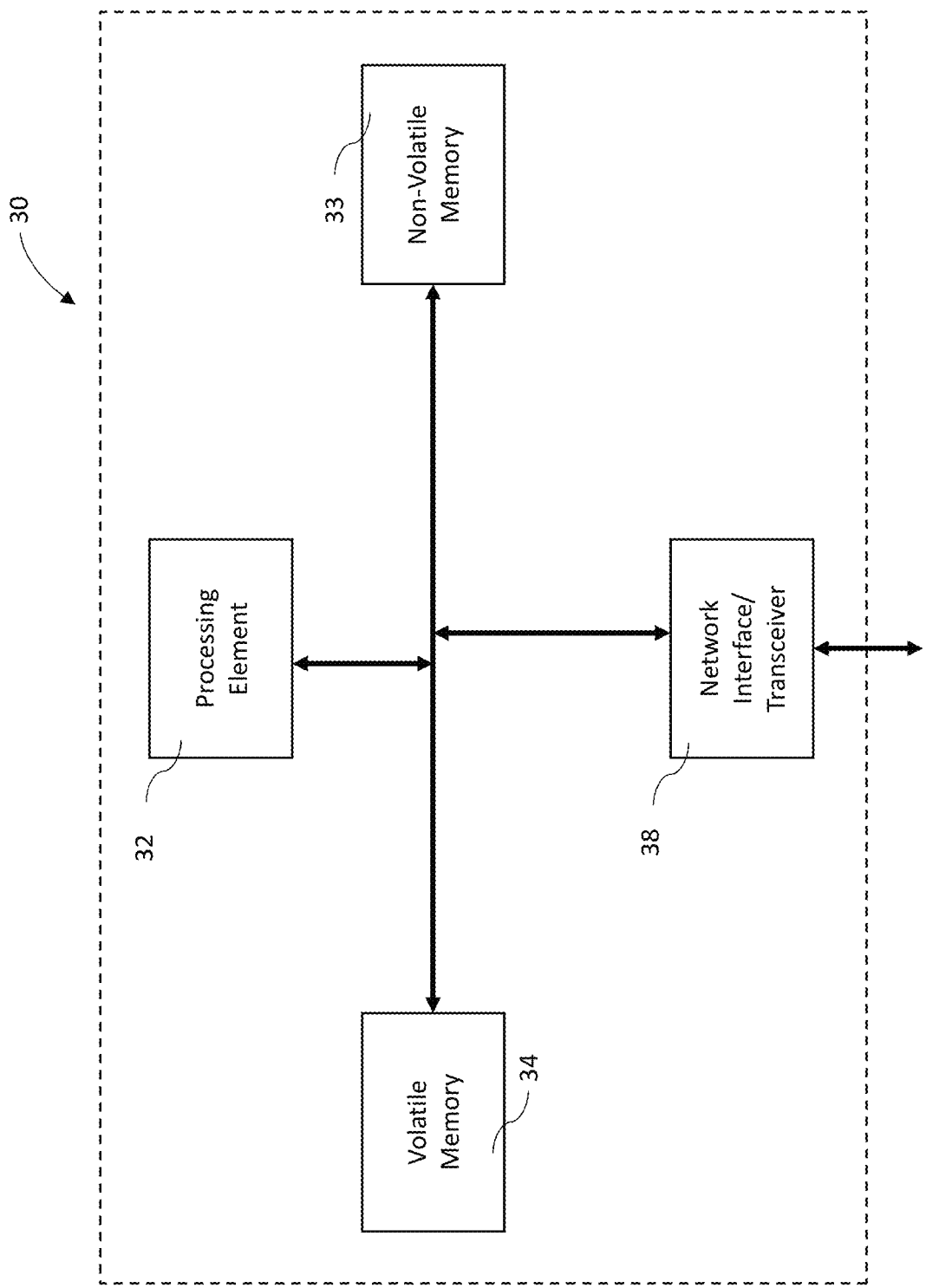
FIG. 3 provides a schematic of an exemplary computing device configured to 3D print according to any of the approaches or methods of the present disclosure.

FIG. 3 provides a schematic of the computing device 30 according to one embodiment of the present invention. In general, the terms computing device, computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As shown in FIG. 3, in one embodiment, the computing device 30 may include or be in communication with one or more processing elements 32 (also referred to as processors, processing circuitry, and/or similar terms used herein interchangeably) that communicate with other elements within the computing device 30 via a bus, for example. As will be understood, the processing element 32 may be embodied in a number of different ways. For example, the processing element 32 may be embodied as one or more complex programmable logic devices (CPLDs), microprocessors, multi-core processors, coprocessing entities, application-specific instruction-set processors (ASIPs), microcontrollers, and/or controllers. Further, the processing element 32 may be embodied as one or more other processing devices or circuitry. The term circuitry may refer to an entirely hardware embodiment or a combination of hardware and computer program products. Thus, the processing element 32 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 32 may be configured for a particular use or configured to execute instructions stored in volatile or non-volatile media or otherwise accessible to the processing element 32. As such, whether configured by hardware or computer program products, or by a combination thereof, the processing element 32 may be capable of performing steps or operations according to embodiments of the present invention when configured accordingly.

In one embodiment, the computing device 30 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 33, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the computing device 30 may further include or be in communication with volatile media (also referred to as volatile storage, memory, memory storage, memory circuitry and/or similar terms used herein interchangeably). In one embodiment, the volatile storage or memory may also include one or more volatile storage or memory media 34, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 32. Thus, the databases, database instances, database management systems, data, applications, programs, program modules, scripts, source code, object code, byte code, compiled code, interpreted code, machine code, executable instructions, and/or the like may be used to control certain aspects of the operation of the computing device 30 with the assistance of the processing element 32 and operating system.

In some embodiments, the computing device 30 may also include one or more network interfaces, such as a transceiver 38 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOC SIS), or any other wired transmission protocol. Similarly, the computing device 30 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the computing device 30 may include or be in communication with one or more input elements, such as a keyboard input, a mouse input, a touch screen/display input, motion input, movement input, audio input, pointing device input, joystick input, keypad input, and/or the like. The computing device 30 may also include or be in communication with one or more output elements (not shown), such as audio output, video output, screen/display output, motion output, movement output, and/or the like.

Exemplary External Computing Entity

Figure 4:
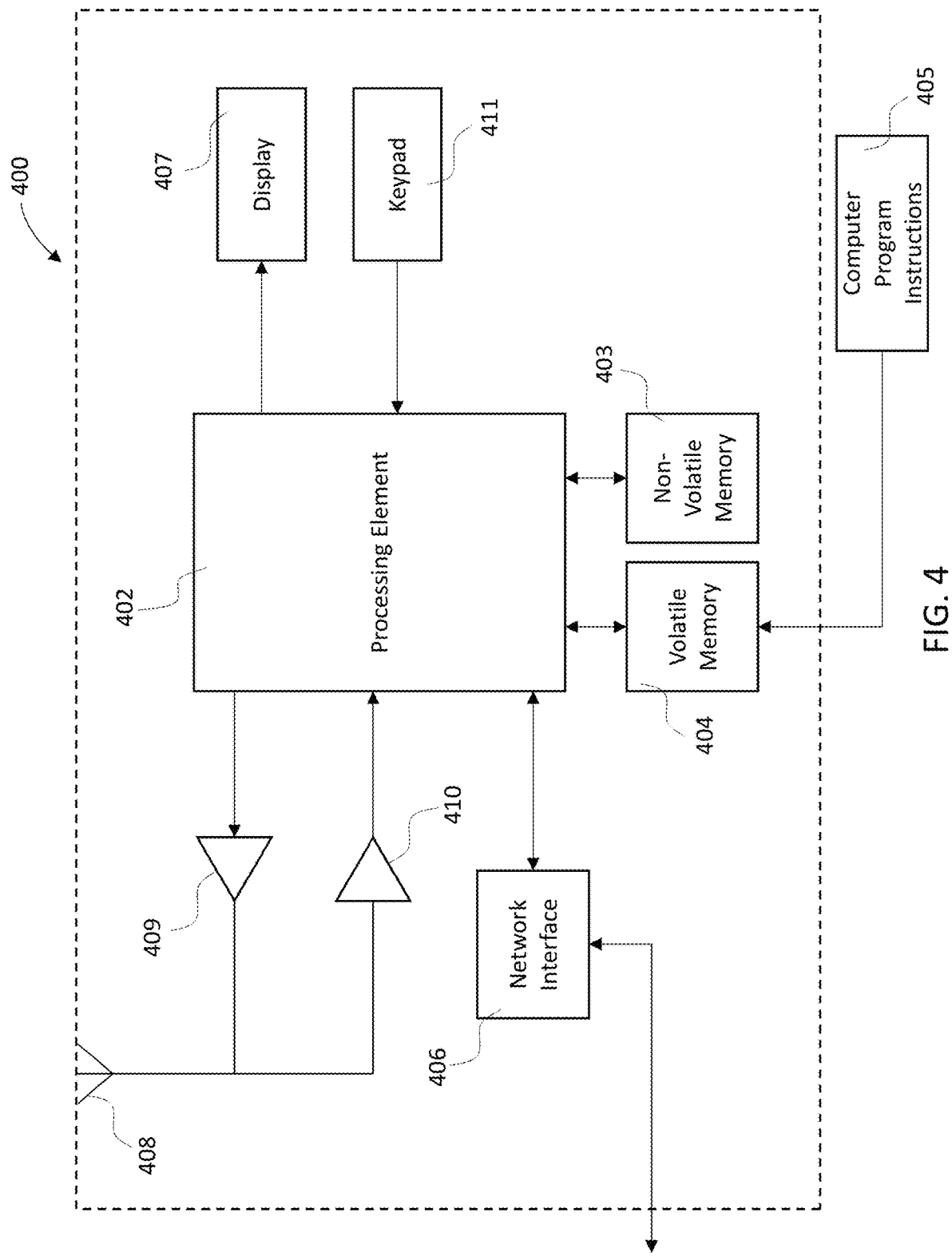
FIG. 4 provides a schematic of an exemplary computing device configured to 3D print according to any of the approaches or methods of the present disclosure.

FIG. 4 provides an illustrative schematic representative of an external computing device 400 that can be used in conjunction with embodiments of the present invention. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. External computing entities 400 can be operated by various parties. As shown in FIG. 4, the external computing device 400 can include an antenna 408, a transmitter 409 (e.g., radio), a receiver 410 (e.g., radio), and a processing element 402 (e.g., CPLDs, microprocessors, multi-core processors, coprocessing entities, ASIPs, microcontrollers, and/or controllers) that provides signals to and receives signals from the transmitter 409 and receiver 410, correspondingly.

The signals provided to and received from the transmitter 409 and the receiver 410, correspondingly, may include signaling information/data in accordance with air interface standards of applicable wireless systems. In this regard, the external computing device 400 may be capable of operating with one or more air interface standards, communication protocols, modulation types, and access types. More particularly, the external computing device 400 may operate in accordance with any of a number of wireless communication standards and protocols, such as those described above with regard to the computing device 30. In a particular embodiment, the external computing device 400 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the external computing device 400 may operate in accordance with multiple wired communication standards and protocols, such as those described above with regard to the computing device 30 via a network interface 406.

Via these communication standards and protocols, the external computing device 400 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The external computing device 400 can also download changes, add-ons, and updates, for instance, to its firmware, software (e.g., including executable instructions, applications, program modules), and operating system.

According to one embodiment, the external computing device 400 may include location determining aspects, devices, modules, functionalities, and/or similar words used herein interchangeably. For example, the external computing device 400 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the external computing entity's 400 position in connection with a variety of other systems, including cellular towers, Wi-Fi access points, and/or the like. Similarly, the external computing device 400 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The external computing device 400 may also comprise a user interface (that can include a display 407 coupled to the processing element 402) and/or a user input interface (coupled to the processing element 402). For example, the user interface may be a user application, browser, user interface, and/or similar words used herein interchangeably executing on and/or accessible via the external computing device 400 to interact with and/or cause display of information/data from the computing device 30, as described herein. The user input interface can comprise any of a number of devices or interfaces allowing the external computing device 400 to receive data, such as a keypad 411 (hard or soft), a touch display, voice/speech or motion interfaces, or other input device. In embodiments including a keypad 411, the keypad 411 can include (or cause display of) the conventional numeric (0-9) and related keys (#, *), and other keys used for operating the external computing device 400 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The external computing device 400 can also include volatile storage or memory 404 and/or non-volatile storage or memory 403, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the external computing device 400. As indicated, this may include a user application that is resident on the entity or accessible through a browser or other user interface for communicating with the computing entity 30 and/or various other computing entities.

In another embodiment, the external computing device 400 may include one or more components or functionality that are the same or similar to those of the computing device 30, as described in greater detail above. As will be recognized, these architectures and descriptions are provided for exemplary purposes only and are not limiting to the various embodiments.

In some embodiments, the apparatus 20 can comprise the computing device 30, the computing device 30 suitable to carry out movement of the various components of the apparatus 20, flow rates or deposition/dispersal volumes, or the like. In some embodiments, the apparatus 20 or a component thereof, e.g., the computing device 30, can be configured to be in communication with the external computing device 400, which can be configured to provide instructions for printing, a design file for a printed article, printing nozzle and/or nebulizer path instructions, or the like to the computing device 30, which is configured to carry out printing.

Referring now to FIG. 5, a method 50 for three-dimensional printing of a polymer article can comprise forming a liquid build material, the liquid build material comprising a polymeric material in a solvent, at 51. In some embodiments, the method 50 can further comprise disposing the liquid build material into a volume of air, at 52.

In some embodiments, the dissolved polymeric material can be injected, spun, inserted, communicated, dropped, conveyed, or otherwise dispensed within the printing environment such that the coagulation agent can facilitate at least partial coagulation of the ink and formation of the intermediate or finished article. Regardless of the particular manner in which the dissolved polymeric material is dispensed within the printing environment, the coagulation agent can cause sufficient coagulation of the printed ink by replacing the solvent in the ink and causing the deposited, at least partially coagulated build material (resulting from the solvent-exchanged ink) to be self-supporting, e.g., of layer-by-layer deposition. According to some embodiments, the intermediate article or finished article may be formed, according to the described approaches, free of printed support structures. Such support structures are used extensively across the array of conventional additive manufacturing and 3D printing techniques and are often required to be trimmed away after formation of the intermediate or finished article. By forming the intermediate article without printed supports, the methods described herein (e.g., the method 50) can eliminate the labor-intensive, costly, and time-consuming process step of trimming away the printed support structures once the article is fully formed.

In some embodiments, the solvent can include at least one from among dimethyl sulfoxide (DMSO), dimethylformamide (DMF), acetonitrile, ethanol, combinations thereof, and the like.

In some embodiments, the method 50 can further comprise spraying a nebulized coagulation agent within a predetermined distance of the disposed liquid build material to at least partially coagulate the liquid build material, thereby forming the article, at 53. As described elsewhere herein, the nebulizing agent may comprise a non-solvent or any suitable material which initiates or accelerates coagulation of the polymer either by phase inversion, by solvent exchange with the disposed liquid build material, or by any other suitable mechanism.

In some embodiments, the method 50 can, optionally, further comprise dissolving the polymeric material in the solvent to form the liquid build material, at 54. In some embodiments, the polymeric material can include at least one from among thermoplastic polymer, thermosetting polymers, acrylonitrile-butadiene-styrene, polyurethane, acrylic, poly(acrylonitrile), polyolefins, polyvinyl chlorides, nylons, fluorocarbons, polystyrenes, polyethylene, ultra-high molecular weight polyethylene, polypropylene, polybutene, polymethylpentene, polyisoprene, copolymers thereof, and their combinations, mixtures containing two or more of the following polyethylene, ultra-high molecular weight polyethylene, and polypropylene, as well as, mixtures of the foregoing with copolymers such as ethylene-butene copolymers and ethylene-hexene copolymers, thermosetting plastics, such as polyimide (PI), poly amide (PA), and poly amide imide (PAI), polypropylene (PP), polyethylene (PE), ethylene vinylacetate (EVA), poly(ethylene terephthalate) (PET), poly-vinyl acetate (PVA), polyamide (PA), acrylic adhesives, ultraviolet (UV)/electron beam (EB)/infrared (IR) curable resin, polyether ether ketone (PEEK), polyethylene naphthalate (PEN), polyethersulfone (PES), polyphenylene sulfide (PPS), polyphenylene oxide (PPO), and any combinations thereof. In some embodiments, the solvent for dissolution of the polymeric material(s) can by any suitable solvent, such as dimethylsulfoxide (DMSO), ethanol, N-methylpyrrolidone, cyclodextrin, a pluronic detergent, liposomes, acetonitrile, N,N-Dimethylformamide (DMF), sodium methyl sulfinylmethylide, dimethyl sulfide, dimethyl sulfone, acetone, dimethylformamide, dimethylacetamide, N-methyl-2-pyrrolidone, HMPA, methanol, isopropanol, tert-butanol, acetic acid, ether, tetrahydrofuran, dichloromethane, chloroform, triethylamine, pyridine, ethyl acetate, variants thereof, combinations thereof, and/or the like.

Referring now to FIG. 6, a method 60 for three-dimensional printing of a polymer article can comprise disposing a first volume of a liquid build material onto a substrate, at 61. The method 60 can further comprise within a predetermined time following disposing the first volume of the liquid build material onto the substrate, spraying a first volume of a nebulized coagulation agent within a predetermined distance of the disposed first volume of the liquid build material to at least partially coagulate the first volume of the first volume of the liquid build material, at 62. The method 60 can further comprise disposing a second volume of the liquid build material onto at least a portion of the at least partially coagulated first volume of the liquid build material, at 63. The method 60 can further comprise within the predetermined time following disposing the second volume of the liquid build material onto at least the portion of the at least partially coagulated first volume of the liquid build material, spraying a second volume of the nebulized coagulation agent within the predetermined distance of the disposed second volume of the liquid build material to at least partially coagulate the second volume of the liquid build material, at 64.

In some embodiments, spraying the first volume and the second volume of the nebulized coagulation agent within the predetermined distance of the disposed first and second volumes of the liquid build material only partially coagulates the liquid build material, the method 60 can further comprise: exposing the article to a post-printing coagulation solution to fully solidify the article. In some embodiments, exposing the article to the post-printing coagulation solution comprises submerging the article in a bath of the post-printing coagulation solution. In some embodiments, the liquid build material comprises at least one polymeric material and at least one solvent. In some embodiments, the method 60 can be carried out by an apparatus comprising one or more reservoirs configured to contain a supply of the liquid build material, a nozzle, and a computing device. In some embodiments, the nozzle is configured and dimensioned to move along a predetermined path within the volume of air to dispose a volume of the liquid build material. In some embodiments, the predetermined path is determined by the computing device based upon an input design file comprising a design of the finished article. In some embodiments, the apparatus can be configured to communicate the liquid build material from the reservoir, through the nozzle, and into the volume of air.

Figure 7:
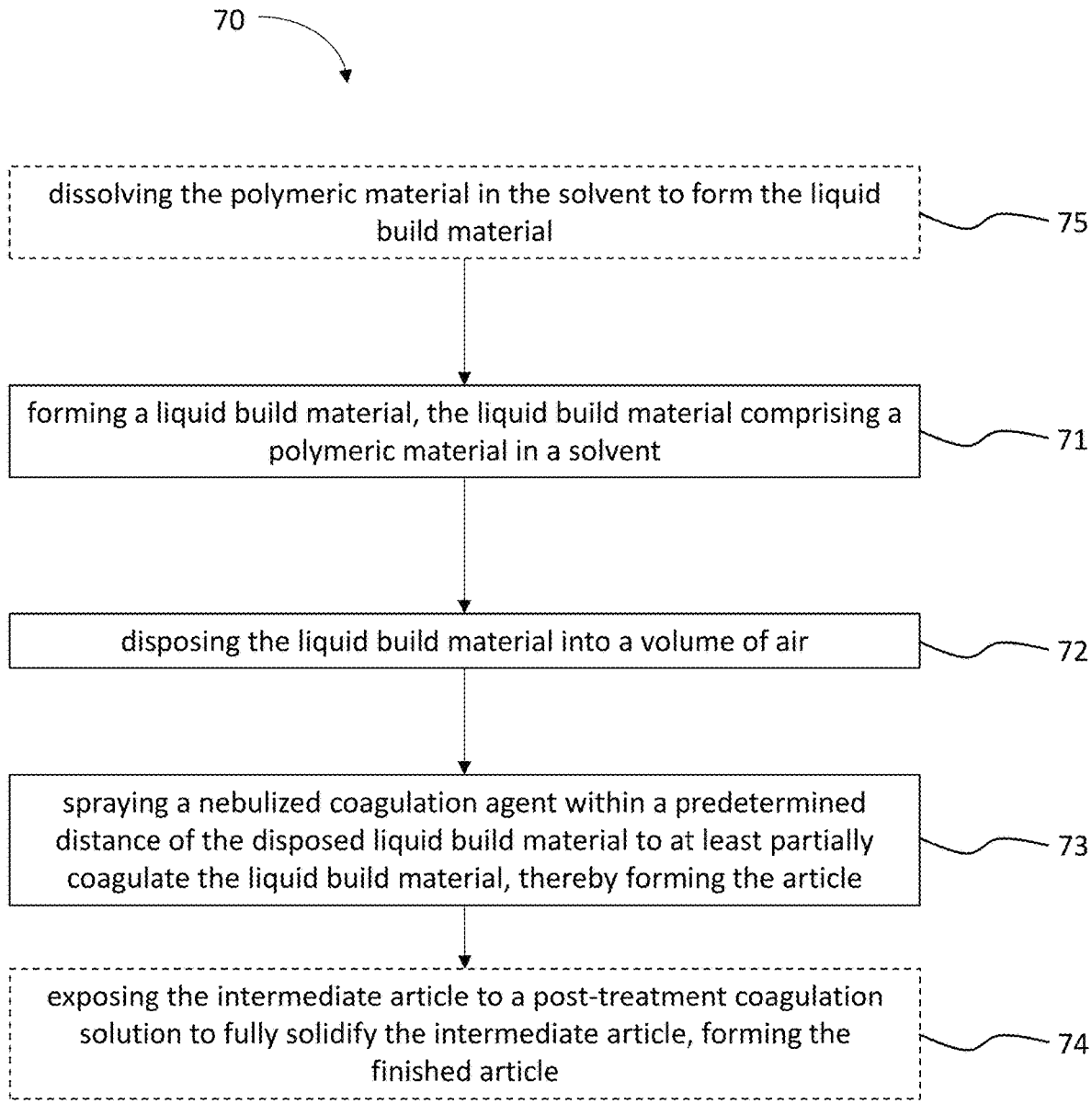
FIG. 7 provides a process flow diagram of a method of 3D printing, according to an embodiment of the present disclosure.

Referring now to FIG. 7, a method 70 for three-dimensional printing of a polymer article can comprise forming a liquid build material, the liquid build material comprising a polymeric material in a solvent, at 71. The method 70 can further comprise disposing the liquid build material into a volume of air, at 72. The method 70 can further comprise spraying a nebulized coagulation agent within a predetermined distance of the disposed liquid build material to at least partially coagulate the liquid build material, thereby forming the article, at 73. The method 70 can, optionally, further comprise exposing the intermediate article to a post-printing coagulation solution to fully solidify the intermediate article, forming the finished article, at 74. The method 70 can, optionally, further comprise dissolving the polymeric material in the solvent to form the liquid build material, at 75.

Figure 8:
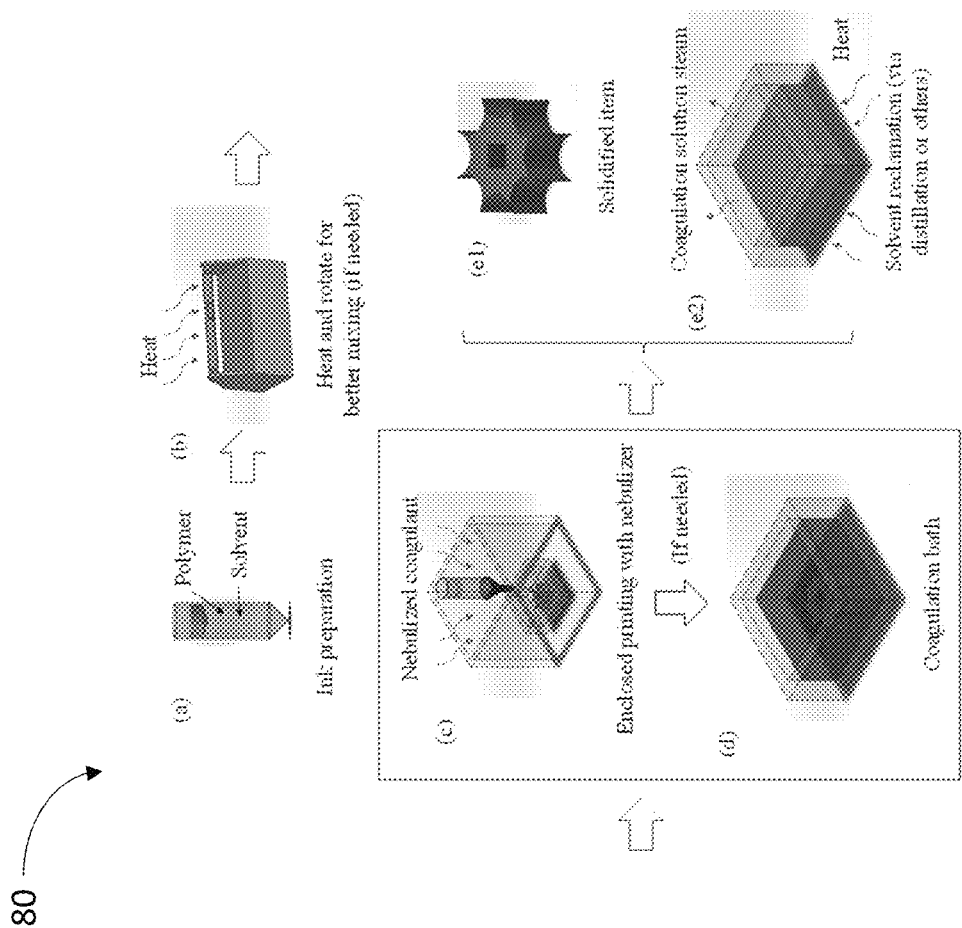
FIG. 8 provides a schematic of an exemplary apparatus for solvent-assisted 3D printing of a polymer build material directly in air, according to an embodiment of the present disclosure.

In some embodiments, spraying the nebulized coagulation agent within the predetermined distance of the disposed liquid build material is done within a predetermined time following the disposing the liquid build material into the volume of air. In some embodiments, spraying the nebulized coagulation agent within the predetermined distance of the disposed liquid build material within the predetermined time following the disposing the liquid build material into the volume of air only partially coagulates the liquid build material, the method 70 can further comprise: exposing the intermediate article to a post-printing coagulation solution to fully solidify the intermediate article, forming the finished article. In some embodiments, exposing the intermediate article to the post-printing coagulation solution comprises submerging the intermediate article in a bath of the post-printing coagulation solution. In some embodiments, the method 70 further comprises dissolving the polymeric material in the solvent to form the liquid build material. In some embodiments, at least one of the forming, the disposing, the spraying, or the exposing is carried out by an apparatus (e.g., the apparatus 20) comprising one or more reservoirs configured to contain a supply of the liquid build material, a nozzle, and a computing device (e.g., the computing device 30, the external computing device 400, etc.). In some embodiments, the nozzle is configured and dimensioned to move along a predetermined path within the volume of air to dispose a volume of the liquid build material. In some embodiments, the predetermined path is determined by the computing device based upon an input design file comprising a design of the finished article. In some embodiments, the apparatus is configured to communicate the liquid build material from the reservoir, through the nozzle, and into the volume of air. In some embodiments, the intermediate article is formed free of printed support structures.

In some embodiments, the build material can comprise any suitable polymeric material such as a thermoplastic. In some embodiments, a polymeric material can be dissolved or dispersed in any suitable solvent. In some embodiments, such a solvent can comprise dimethyl sulfoxide (DMSO), and/or the like. In some embodiments, to form the build material, the polymeric material can be dissolved in the solvent partially or fully, at about room temperature (about 20° C. to about 25° C.), or at an elevated temperature, while being stirred, shaken, agitated, bombarded with electromagnetic radiation and/or ultrasonic sound waves, or the like. In some embodiments, one or more solvents can be chosen that are capable of breaking down the build material without causing molecular degradation or a reduction in the degree of polymerization (DP). Conventional additive manufacturing and 3D printing techniques for polymeric materials typically requires melting the polymeric material at least partially if not fully to facilitate the communication and build-up of the article using the polymeric material. These conventional additive manufacturing and 3D printing techniques for polymeric materials can require high heat, which can make the process costly, dangerous, time-consuming, and limiting in terms of the reusability of printing materials. By contrast, the room temperature process according to some embodiments described herein requires no heating of the printing materials, no thermal deterioration of the polymers, and can eliminate the process step from conventional additive manufacturing and 3D printing methods of heating and/or melting the polymeric material.

In some embodiments, the post-printing solidification bath can comprise any suitable material with regard to the 3D printing material (e.g., the build material) and/or the solvent chosen, for instance one or more of water, deionized water, ethanol, and the like. Many other compositions and concentrations of post-printing coagulation solution were tested, are contemplated, and are within the scope of the current disclosure.

In some embodiments, the polymeric material can be dissolved or dispersed in any suitable solvent, such as but not limited to dimethyl sulfoxide (DMSO), and the like. The polymeric material can be dissolved or dispersed in the solvent partially or fully, at about room temperature (about 20° C. to about 25° C.). Alternatively, the polymeric material can be dissolved or dispersed at a temperature less than or greater than about room temperature. In some embodiments, dissolution of the polymer material for 3D printing can be accomplished with the help of other processes or energies, such as by stirring, shaking or agitating the polymeric material/solvent mixture, by bombarding the mixture with ultrasonic waves, electromagnetic energy, or other energies, and/or the like. The solvent or solvents can be chosen such that the solvent can break down the build material without causing molecular degradation or a reduction in the degree of polymerization (DP). Conventional additive manufacturing and 3D printing techniques for polymeric materials typically requires melting the polymeric material at least partially if not fully to facilitate the communication and build-up of the article using the polymeric material. These conventional additive manufacturing and 3D printing techniques for polymeric materials can require high heat to melt the build material, which can make the conventional processes costly, relatively more dangerous, time-consuming, and/or limiting in terms of the reusability of printing materials. By contrast, the methods 50, 60, 70 described herein, according to some embodiments, can be carried out at or around room temperature and therefore do not require heat to be applied during the process, do not induce thermal deterioration of the polymers, and may eliminate the process steps of heating and/or melting the polymeric material.

Select Experimental Results

Referring now to FIG. 8, an exemplary process 80 is provided for solvent-assisted 3D printing of a build material (e.g., "ink") in air at ambient temperature and pressure, without requiring melting of the polymer in the build material, without requiring any concurrently printed supports, and without requiring the use of a liquid or semi-solid support bath material during printing.

According to some embodiments, the ink can be prepared by mixing about 50% (v/v) of a solvent, e.g., DMSO (Bioreagent grade, Fisher, Fair Lawn, N.J., USA) with about 50% (w/v) of a polymeric material, e.g., ABS (ABSplus P430, Stratasys, Eden Prairie, Mich., USA) (FIG. 8, element (a). The mixture can be warmed up to about 80° C. and continuously stirred (FIG. 8, element (b)) to ensure faster dissolution, e.g., using a roller mixer (DLAB Scientific, Riverside, Calif., USA) to enhance homogeneity within the mixture. The ink can then be loaded in a disposable 5 mL syringe fitted with a stainless steel 23-gauge tip (Nordson EFD, Vilters, Switzerland). The syringe can then be assembled onto a Hyrel Engine SR (Hyrel3D, Norcross, Ga., USA) with a CSD-5 dispensing head (ultraviolet array not used). In some embodiments, G-code files can be obtained by slicing STL models using the embedded Slic3r utility in Hyrel's Repetrel software. Some parameters that can be used are: layer thickness 0.15 mm and speed 60-120 mm/min. While printing, a deionized water mist can be supplied simultaneously as a coagulant (FIG. 8, element (c)) using a nebulizer (Lumiscope, East Rutherford, N.J., USA) in order to induce at least partial coagulation onto the structure being printed. In some embodiments, an enclosed chamber can be used to control the printing environment. The 3D printed part can then be immersed in water, e.g., 100 mL of water for 1 hour, to enhance the replacement of the solvent (e.g., DMSO) with coagulant/non-solvent (e.g., water) and therefore fully coagulate the printed polymer part (FIG. 8, element (d)). In some embodiments, the post-printing coagulation/solidification bath may not be needed, but in other embodiments it may be used to fully facilitate the non-solvent—solvent exchange and fully solidify the printed article. In some embodiments, the printed part can then be dried, e.g., at room temperature (FIG. 8, element (e1)), and the process-induced solvent can be reclaimed, e.g., through a distillation process (FIG. 8, element (e2)).

Exemplary Printed Articles

One or more of the described processes 10, 80, or methods 50, 60, 70 (including parts or variations thereof) can be carried out for the fabrication of arbitrary parts in arbitrary orientations. In other words, the complexity, costliness, and time necessary to carry out fabrication is at least partially decoupled from the shape, dimensions, and complexity of the article being fabricated. The implications for practical applications are surprising and significant. Conversely, 3D printing a polymeric article, e.g., an article having high complexity, according to conventional processes requires a not insignificant amount of thought, time, and/or computing power be dedicated to the printing orientation of the part to maximize printing precision and minimize printing time, requires careful placement of printed support structures such that the printed article is sufficiently stabilized and such that the printed support structures are minimized, and requires time, labor, and therefore cost to trim away the support structures from the finished article, a process which sometimes damages the printed article such that the printed article must be scrapped. The 3D printing methods, e.g., the methods 50, 60, 70, described herein can eliminate the need for a particular orientation, are not rendered more time-consuming or costly with increasing article complexity, and do not require support structures to be printed concurrent to the printing of the article, meaning less 3D printing/build material is wasted and the printed support structure trimming step is eliminated completely. The advantages in terms of production cost and time for 3D printed articles, among other advantages associated with these methods, are clear.

Figure 9:
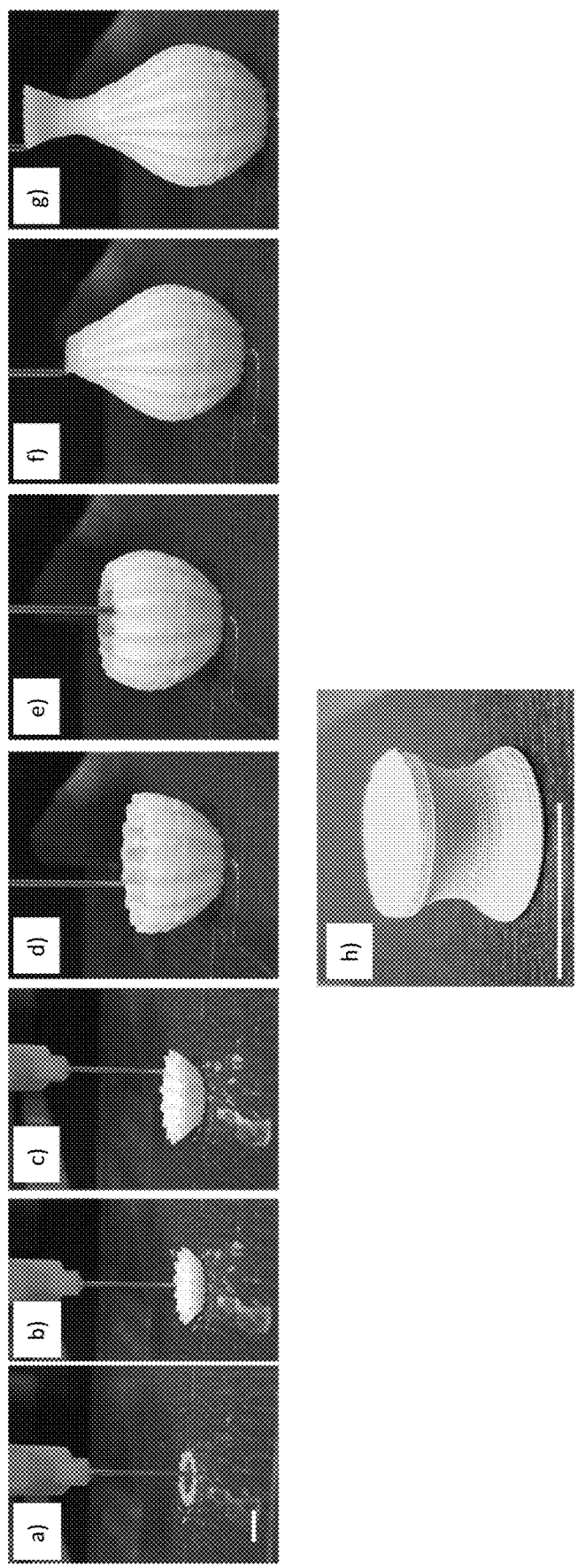
FIG. 9 illustrates a printing sequence for 3D printing a vase-like article and a 3D printed bulky part, according to some embodiments of the present disclosure.

By way of example only, exemplary printed articles are illustrated in FIG. 9. For instance, a printing sequence is illustrated in FIG. 9, in photographs a) through g), that captures the printing process at various points during the printing process, for a thin-walled ABS vase. Likewise, photo h) of FIG. 9 illustrates a bulky ABS article printed according to one of the disclosed solvent-assisted 3D printing in air methods or approaches. In FIG. 9, the inset white scale bars in photo a) and photo h) both illustrate 10 mm with respect to the scale of the printed articles.

In general, the printed parts closely match the original design, regardless of the build material. For each material, ink polymer/solvent concentrations, coagulant choice and concentration, post-printing solidification bath materials, and print parameters were optimized for best results; material details are discussed in more detail elsewhere herein. Wall thickness of, for example, the printed vase of FIG. 9, photos a)-g), was on the order of between about 100 µm and about 500 µm, inclusive of all values and ranges therebetween. In some embodiments, the wall thickness of a hollow printed article and/or other dimensions can be reduced by reducing the size or bore of the printing nozzle.

As illustrated, printed ABS structures demonstrate a variety of feature types: thin walls, flat overhangs, solid regions, and detailed surfaces. The gear vase and tubular structures illustrate the ability to print functional containers and conduits with arbitrary features otherwise unachievable by additive manufacturing such as the perfectly horizontal upper section of the T-junction. Attempting to form structures having a similar form factor using FDM would require a more complex printing process and would result in a formed article that is mechanically and structurally deficient. For instance, to print structures having a similar form factor using FDM would require the part and/or the entire printing platform be rotated in space during printing, resulting in a more complex printing process, requiring more complex parts since analogous features may not have an "easy" orientation for 3D printing according to FDM. In contrast, using a direct printing in air approach in conjunction with a misted or nebulized coagulant, according to any of the embodiments described herein, the print quality is nearly independent of orientation of the printed article and results in more accurate and precise printing of the article relative to the input model. Also, the thin walls of a printed tube or vase, which oftentimes deform during or after FDM printing, were substantially unaffected by gravity during the disclosed solvent-enabled direct freeform printing in air approach, which may be due to the fact that at least a part, e.g., a surface portion, of the deposited ink coagulates in the presence of the nebulized or aerosolized or misted coagulant, meaning that the strain of gravity and other factors on the intermediate article during printing does not cause deformation or strain of the intermediate article.

By way of example only, since the coagulation of the printed material often requires diffusion of the dispersed (e.g., nebulized) coagulation agent into the ink, thin walled parts or shells such as the hollow vase structures are sometimes more convenient to print using the described processes than according to any conventional process. Furthermore, in some embodiments, such as illustrated in FIG. 9, photo h), bulk solid parts are also achievable using the described approaches. Blocks having dimensions of, for instance, 8×8×6 mm were printed as a test case to determine parameters and verify that they can be fabricated, however other bulk and solid parts and structures were also successfully printed, and many others were contemplated and are covered by the present disclosure. The coagulation process for material within the bulk part is complicated by the presence of the coagulated shell around the exterior. This prevents shrinkage of the overall shape as solvent slowly diffuses out of the interior leaving behind coagulated solid build material. In some cases, the volumetric shrinkage is accommodated by the formation of void space within the bulk part, as discussed in more detail in the following section. A more controllable option is to reduce the print speed so that the interior layers almost completely coagulate as the next layer is being printed. This ensures that the entire volume of the printed part experiences similar coagulation conditions and minimizes the occurrence of voids in printed parts.

As described herein, processes, approaches, methods, apparatuses, systems, computer program products, and the like are described for polymer 3D printing of dissolved polymer into air to form an article or other structure, while a coagulation agent is delivered, e.g., in nebulized form, to at least partially solidify printed features. Without wishing to be bound by any particular theory, the at least partial solidification caused by nebulized coagulation agent, may be caused by a phase inversion mechanism. In some embodiments, delivering a nebulized coagulation agent before, during, and/or after deposition, injection, or printing of the build material may enhance the self-supporting property of the printed part as the phase inversion process begins and/or is carried out. As a result, polymer structures can be printed in air at room temperature without the need to melt the polymer or inject/print the melted polymer in layers and at a pace suitable for cooling of the deposited melted polymer layers. According to some embodiments, a post-printing process, if needed, can include fully solidifying the printed part by immersing it in a post-printing solidification bath to induce a complete solvent-non-solvent exchange, and reclaiming residual solvent for the printing chamber and post-printing solidification bath. The described polymer printing approach was experimentally shown to work using DMSO as a solvent, ABS as a build polymer, and a water mist as a coagulation agent during, before, and/or immediately after printing, which enabled the printed polymer structures to be printed at ambient temperature and pressure and to self-supporting without requiring concurrently printed support structures or a yield-stress support bath.

According to some embodiments, the methods disclosed herein are capable of freeform printing using materials such as acrylonitrile butadiene styrene (ABS), polyurethane (PU), polyacrylonitrile (PAN, also known as polyvinyl cyanide), acrylics, and/or other suitable materials, to form finished articles having wide ranges of dimensions, complexity, and printing precision. By way of example only, complex and precise articles such as a spiral cone can be printed according to embodiments of the method described herein, the precise article having a singular support at the top of the spiral cone from which the arms of the spiral cone extend rotationally. According to some embodiments, the methods, e.g., the method 10, disclosed herein typically result in superior article properties and result in the realization of certain efficiencies during printing associated with only printing the article and not printing support structures. Furthermore, there are efficiencies of post-processing associated with not having to remove (trim) support structures from the 3D printed article. Also, the coagulation agent and/or post-printing solidification bath (or portions thereof) may be reusable for subsequent printing or solidification of another article, which may mean that, unlike conventional 3D printing platforms which must be cleaned and any excess printing medium or build material removed before subsequent printing within or on the same 3D printing platform, the disclosed methods, apparatuses, systems, and materials enable the rapid reuse of the 3D printing platform and the rapid completion of a finished article without requiring, for instance, the removal of support structures from the printed article.

In some embodiments, a polymer 3D printing method is illustrated that is configured to enable freeform fabrication of polymeric structures under ambient conditions without the use of printed support structures. In some embodiments, the method can include injecting a thermoplastic polymer and solvent solution into an air-filled printing environment. The injecting can be carried out by any suitable mechanical apparatus such as a syringe, plunger, nozzle, pipe, conduit, pathway, or the like. In some embodiments, the build material, can be previously dissolved or caused to be dissolved in a suitable solvent to make a viscous polymer solution, which can be loaded into an ink reservoir for extrusion printing as part of the injecting. The polymer solution, during the injecting, can be directly printed in (injected into) the open air of the printing environment, and can be supported initially on a substrate at the bottom of the printing environment and then can be self-supported by earlier/lower portions of the 3D printed article that were already printed and at least partially coagulated or at least partially solidified.

In some embodiments, the printing nozzle or other mechanical apparatus configured to inject or extrude the build material into the printing environment can be fixed or configured to be moved during the injecting. For instance, in some embodiments, a computing device, e.g., a computer including at least one processor and at least one memory device, can be configured to move or cause movement of the printing nozzle between different locations or portions of the printing environment, e.g., printing enclosure. In some embodiments, the computing device can move or cause movement of the printing nozzle along a computer-controlled path or paths while injecting to form filaments, layers, and eventually an entire 3D part in the printing environment.

Likewise, a nozzle, such as a spray nozzle, nebulizer nozzle, or the like may be used to deliver a volume of the coagulation agent to the printing environment.

In some embodiments, after introducing the coagulation agent, the printed part may be only partially coagulated for some time after injecting or may remain only partially coagulated for an extended period of time after injecting. Partial coagulation may effectively prevent excessive deformation of the printed ink such that the full intermediate article can be formed without a loss of form factor or dimensions relative to the desired form factor and dimensions of the printed article between the time that the intermediate article is printed and the time that full coagulation/solidification takes place. In some embodiments, one of the important functions of the one or more solvents in the build material (ink) may be to dissolve or otherwise comingle one or more polymeric materials with the one or more solvents and to prevent unwanted, early coagulation of polymers in the build material before the build material is properly printed into the printing environment. In some embodiments, a non-solvent such as the coagulation agent or a component thereof may be delivered to nearby (e.g., within a predetermined distance of) the printed build material to initiate the (at least partial) coagulation process. Thus, the type of solvent and non-solvent chosen, as well as the ratio of solvent in the build material to non-solvent in the coagulation agent can be finely tuned, in light of the material choices and ratio of polymeric build material and solvent in the printing solution, to achieve the desired degree of coagulation for an intermediate article or a finished article.

In some embodiments in which the coagulation agent produces an only partially coagulated build material, thereby forming the intermediate article, the method can further include exposing the intermediate article to a post-printing solidification bath, e.g., by immersing the intermediate article in the post-printing solidification bath, to solidify the intermediate article and thereby form the finished article, a fully solidified 3D printed polymer part or bulk object. After sufficient time and/or once the finished article is formed in terms of the degree of coagulation/solidification of the article, the finished article can then be removed from the post-printing solidification bath. In some embodiments, no further steps or processes or treatments are required after removal of the finished article the post-printing solidification bath in order to achieve a finished article having the desired dimensions and mechanical properties of the finished printed part.

In some embodiments, it may be helpful for a structure being printed to remain partially liquid (to be only partially coagulated) to avoid filament/layer interfaces and nozzle clogging. The printing of a partially liquid structure can be accomplished using the nebulized or otherwise dispersed coagulation agent or non-solvent before, during, and/or immediately after printing of the build material into the printing environment.

In some embodiments, once the ink (e.g., solvent solution comprising fluid build material) is injected, dispensed into, extruded, and/or otherwise disposed within the printing environment and exposed to the coagulation agent dispersed nearby the point of printing of the build material, the ink (e.g., comprising the fluid build material) is then at least partially coagulated and trapped in the particular desired location within the printing environment as the printing nozzle travels away from the particular location at which the ink is deposited. In some embodiments, the build material is then trapped in a 3D configuration defined by a travel path defined for the printing nozzle and may retain its shape even though it is still partially fluid. In some embodiments, the dispersed coagulation agent may coagulate or cause solidification of only a surface or a surface portion of the deposited ink, which may mean that a portion of the printed ink within the solidified portion or partially solidified portion of the deposited ink may remain partially or fully liquid. An entire 3D fluid intermediate part can be formed in this way. Then, a stimulus can be applied which causes or contributes to full or solidification or partial solidification of the at least partially fluid (only partially coagulated) build material so that it can be removed from the printing environment as an intact part and exposed to or immersed in the post-printing solidification bath. In some embodiments, the intermediate part can be exposed to the post-printing solidification bath or a further coagulation solution, which may be similar to or different from the dispersed coagulation agent in terms of material(s) used phase(s); while in other embodiments the coagulation solution or the like can be introduced to the printing environment without first moving the intermediate article out of the printing environment, thereby exposing the intermediate article to the coagulation solution or the like.

CONCLUSIONS

A polymer three-dimensional (3D) printing method and associated apparatus are disclosed for fabrication of 3D printed structures and articles. In some embodiments, the fabrication may be freeform fabrication. In some embodiments, the 3D printed structures and articles may be formed from a build material, such as a polymeric material with the assistance of a solvent or a polymer/solvent solution.

In some embodiments, 3D printed structures and articles may be fabricated under ambient conditions and/or without the use of printed support structures which would need to be removed after 3D printing in order to achieve the finished structure or article. In some embodiments, a build material can be dissolved in a suitable solvent or solvent solution (e.g., solvent/non-solvent mixture) such that the resulting solution is a suitable ink for 3D printing. In some embodiments, the build material can comprise one or more polymers or a polymer solution. In some embodiments, the ink, comprising the build material, can be disposed within a printing volume or onto a printing platform without the use of supports or other structures being previously, concurrently, or subsequently printed to support the build material while the build material solidifies. In some embodiments, freeform printing can be carried out at ambient temperature and pressure. In some embodiments, just previous to, concurrent with, or just following the disposition of ink into the printing volume or onto the printing platform, a volume of a coagulation agent, such as a coagulant, a non-solvent, variations thereof, or combinations thereof, can be disposed, such as by an aerosol sprayer or other suitable dispensing mechanism, to a volume directly adjacent the disposed ink. Without wishing to be bound by any particular theory, the coagulation agent can cause partial, substantially complete, or complete coagulation, solidification, polymerization, phase inversion, cross-linking, crystallization, calcification, concretion, setting, stiffening, hardening, amalgamation, strengthening, gelation, congealing, thickening, densification, annealing, shaping, forming, clotting, variations thereof, combinations thereof, or the like. As such, a first volume of ink can be printed, e.g., by a nozzle or the like, in a freeform manner directly into air and partially or fully solidified by disposing a first volume of the coagulation agent sufficiently close by the printed ink, the nozzle can move a distance, in a particular direction, from the previous printing location and print a second volume of ink, e.g., adjacent the first volume of ink (now partially or fully solidified), dispose a second volume of the coagulation agent to partially or fully solidify the second volume of ink, and continue along a predetermined path through the printing volume or across the printing platform in order to completely print an intermediate or finished article without being required to melt the build material, without requiring use of support structures, and/or without requiring use of a support bath or the like to maintain the structure of the printed article prior to completion of printing of the article. In some embodiments, an intermediate article may be one in which some or all of the article is only partially solidified or for which further processing is helpful or required to achieve the finished article.

In some embodiments, if an intermediate article is formed, heat, a chemical reactant, electromagnetic radiation, and/or the like may be used to fully solidify or otherwise process the intermediate article to form the finished article.

In some embodiments, a method for three-dimensional printing of a printed article can comprise forming a liquid build material, the liquid build material comprising a polymeric material in a solvent; disposing the liquid build material into a volume of air; and spraying a nebulized coagulation agent within a predetermined distance of the disposed liquid build material to at least partially coagulate the liquid build material, thereby forming the article. In some embodiments, spraying the nebulized coagulation agent within the predetermined distance of the disposed liquid build material is done within a predetermined time following the disposing the liquid build material into the volume of air. In some embodiments, spraying the nebulized coagulation agent within the predetermined distance of the disposed liquid build material within the predetermined time following the disposing the liquid build material into the volume of air only partially coagulates the liquid build material, the method further comprising: exposing the intermediate article to a post-printing coagulation solution to fully solidify the intermediate article, forming the finished article. In some embodiments, exposing the intermediate article to the post-printing coagulation solution comprises submerging the intermediate article in a bath of the post-printing coagulation solution. In some embodiments, the method further comprises dissolving the polymeric material in the solvent to form the liquid build material. In some embodiments, at least one of the forming, the disposing, the spraying, or the exposing is carried out by an apparatus comprising one or more reservoirs configured to contain a supply of the liquid build material, a nozzle, and a computing device. In some embodiments, the nozzle is configured and dimensioned to move along a predetermined path within the volume of air to dispose a volume of the liquid build material. In some embodiments, the predetermined path is determined by the computing device based upon an input design file comprising a design of the finished article. In some embodiments, the apparatus is configured to communicate the liquid build material from the reservoir, through the nozzle, and into the volume of air. In some embodiments, the intermediate article is formed free of printed support structures.

In some embodiments, the method can further comprise, optionally, dissolving a polymeric material in a solvent to form the build material (e.g., "the liquid build material," "the ink," or "the polymeric solution"). In some embodiments, the build material can comprise any suitable polymeric material such as a thermoplastic. In some embodiments, a polymeric material can be dissolved or dispersed in any suitable solvent. In some embodiments, such a solvent can comprise dimethyl sulfoxide (DMSO), and/or the like. In some embodiments, to form the build material, the polymeric material can be dissolved in the solvent partially or fully, at about room temperature (about 20° C. to about 25° C.), or at an elevated temperature, while being stirred, shaken, agitated, bombarded with electromagnetic radiation and/or ultrasonic sound waves, or the like. In some embodiments, one or more solvents can be chosen that are capable of breaking down the build material without causing molecular degradation or a reduction in the degree of polymerization (DP). Conventional additive manufacturing and 3D printing techniques for polymeric materials typically requires melting the polymeric material at least partially if not fully to facilitate the communication and build-up of the article using the polymeric material. These conventional additive manufacturing and 3D printing techniques for polymeric materials can require high heat, which can make the process costly, dangerous, time-consuming, and limiting in terms of the reusability of printing materials. By contrast, the room temperature process according to some embodiments described herein requires no heating of the printing materials, no thermal deterioration of the polymers, and can eliminate the process step from conventional additive manufacturing and 3D printing methods of heating and/or melting the polymeric material.

According to another embodiment, a method can be provided for 3D printing an article that comprises: disposing a first volume of a liquid build material onto a substrate; within a predetermined time following disposing the first volume of the liquid build material onto the substrate, spraying a first volume of a nebulized coagulation agent within a predetermined distance of the disposed first volume of the liquid build material to at least partially coagulate the first volume of the first volume of the liquid build material; disposing a second volume of the liquid build material onto at least a portion of the at least partially coagulated first volume of the liquid build material; and within the predetermined time following disposing the second volume of the liquid build material onto at least the portion of the at least partially coagulated first volume of the liquid build material, spraying a second volume of the nebulized coagulation agent within the predetermined distance of the disposed second volume of the liquid build material to at least partially coagulate the second volume of the liquid build material. In some embodiments, spraying the first volume and the second volume of the nebulized coagulation agent within the predetermined distance of the disposed first and second volumes of the liquid build material only partially coagulates the liquid build material, the method further comprising: exposing the article to a post-printing coagulation solution to fully solidify the article. In some embodiments, exposing the article to the post-printing coagulation solution comprises submerging the article in a post-printing solidification bath of the post-printing coagulation solution. In some embodiments, the liquid build material comprises at least one polymeric material and at least one solvent. In some embodiments, the method can be carried out by an apparatus comprising one or more reservoirs configured to contain a supply of the liquid build material, a nozzle, and a computing device. In some embodiments, the nozzle is configured and dimensioned to move along a predetermined path within the volume of air to dispose a volume of the liquid build material. In some embodiments, the predetermined path is determined by the computing device based upon an input design file comprising a design of the finished article. In some embodiments, the apparatus can be configured to communicate the liquid build material from the reservoir, through the nozzle, and into the volume of air.

As such, according to another embodiment, an apparatus can be provided for 3D printing a finished article. In some embodiments, the apparatus can comprise: a printing space comprising an air-filled inner volume and a printing substrate; a reservoir configured to contain a supply of a liquid build material; a nozzle coupled to the reservoir and configured to dispose a volume of the liquid build material into the air-filled inner volume of the printing space; a nebulizer configured to nebulize a coagulation agent and disperse the nebulized coagulation agent within a predetermined distance of the disposed volume of liquid build material to at least partially coagulate the disposed volume of liquid build material; and a computing device configured to control movement of the nozzle and the disposing of the volume of the liquid build material into the air-filled inner volume of the printing space. In some embodiments, the nebulized coagulation agent may only partially coagulate the disposed volume of liquid build material to form an intermediate article. As such, in some embodiments, the apparatus can further comprise, optionally, a post-printing solidification bath comprising a coagulation fluid, the post-printing solidification bath configured to receive the intermediate article, the coagulation fluid operable to fully solidify the article, if needed, thereby forming the finished article.

In some embodiments, the build material can comprise a polymeric material, such as at least one from among thermoplastic polymer, thermosetting polymers, acrylonitrile-butadiene-styrene, polyurethane, acrylic, poly(acrylonitrile), polyolefins, polyvinyl chlorides, nylons, fluorocarbons, polystyrenes, polyethylene, ultra-high molecular weight polyethylene, polypropylene, polybutene, polymethylpentene, polyisoprene, copolymers thereof, and their combinations, mixtures containing two or more of the following polyethylene, ultra-high molecular weight polyethylene, and polypropylene, as well as, mixtures of the foregoing with copolymers such as ethylene-butene copolymers and ethylene-hexene copolymers, thermosetting plastics, such as polyimide (PI), poly amide (PA), and poly amide imide (PAI), polypropylene (PP), polyethylene (PE), ethylene vinylacetate (EVA), poly(ethylene terephthalate) (PET), poly(vinyl acetate) (PVA), polyamide (PA), acrylic adhesives, ultraviolet (UV)/electron beam (EB)/infrared (IR) curable resin, polyether ether ketone (PEEK), polyethylene naphthalate (PEN), polyethersulfone (PES), polyphenylene sulfide (PPS), polyphenylene oxide (PPO), combinations thereof, and/or the like.

In some embodiments, the solvent can comprise at least one from among dimethyl sulfoxide (DMSO), dimethylformamide (DMF), acetonitrile, ethanol, combinations thereof, and/or the like.

In some embodiments, such as when the nebulized coagulation agent only partially coagulates the liquid build material to form an intermediate part, the intermediate part can be immersed, submerged, dipped, sprayed with, coated with, or otherwise exposed to a coagulation solution to fully solidify the intermediate part into the finished article. The coagulation solution can comprise any suitable material, for instance one or more of water, deionized water, ethanol, or the like.

It should be appreciated that all combinations of the foregoing concepts and additional concepts discussed in greater detail below (provided such concepts are not mutually inconsistent) are contemplated as being part of the inventive subject matter disclosed herein. In particular, the combinations of claimed subject matter appearing at the end of this disclosure are contemplated as being part of the inventive subject matter disclosed herein. It should be appreciated that terminology explicitly employed herein that also may appear in any disclosure incorporated by reference should be accorded a meaning consistent with the particular concepts disclosed herein.

In some embodiments, one or more of the operations, steps, elements, or processes described herein may be modified or further amplified as described below. Moreover, in some embodiments, additional optional operations may also be included. It should be appreciated that each of the modifications, optional additions, and/or amplifications described herein may be included with the operations previously described herein, either alone or in combination, with any others from among the features described herein.

The provided method description, illustrations, and process flow diagrams are provided merely as illustrative examples and are not intended to require or imply that the steps of the various embodiments must each or all be performed and/or should be performed in the order presented or described. As will be appreciated by one of skill in the art, the order of steps in some or all of the embodiments described may be performed in any order. Words such as "thereafter," "then," "next," etc. are not intended to limit the order of the steps; these words are simply used to guide the reader through the description of the methods. Further, any reference to claim elements in the singular, for example, using the articles "a," "an," or "the" is not to be construed as limiting the element to the singular. Further, any reference to dispensing, disposing, depositing, dispersing, conveying, injecting, inserting, communicating, and other such terms of art are not to be construed as limiting the element to any particular means or method or apparatus or system, and is taken to mean conveying the material within the receiving vessel, solution, conduit, or the like by way of any suitable method.

Many modifications and other embodiments of the inventions set forth herein will come to mind to one skilled in the art to which these inventions pertain having the benefit of teachings presented in the foregoing descriptions and the associated drawings. Although the figures only show certain components of the apparatus and systems described herein, it is understood that various other components may be used in conjunction with the system. Therefore, it is to be understood that the inventions are not to be limited to the specific embodiments disclosed and that modifications and other embodiments are intended to be included within the scope of the appended claims. Moreover, the steps in the method described above may not necessarily occur in the order depicted in the accompanying diagrams, and in some cases one or more of the steps depicted may occur substantially simultaneously, or additional steps may be involved. Although specific terms are employed herein, they are used in a generic and descriptive sense only and not for purposes of limitation. Specific equipment and materials described in the examples are for illustration only and not for purposes of limitation. For instance, any and all articles, portions of articles, structures, bulk materials, and/or the like, having any form factor, scale, dimensions, aesthetic attributes, material properties, internal structures, and/or mechanical properties, which are formed according to any of the disclosed methods, approaches, processes, or variations thereof, using any devices, equipment, apparatuses, systems, or variations thereof, using any of the build material, printing mixture, ink, yield-stress support material, or other material compositions described herein or variations thereof, are all contemplated and covered by the present disclosure. None of the examples provided are intended to, nor should they, limit in any way the scope of the present disclosure.

Every document cited or referenced herein, including any cross referenced or related patent or application is hereby incorporated herein by reference in its entirety unless expressly excluded or otherwise limited. The citation of any document and/or the mention of methods or apparatuses as being conventional, typical, usual, or the like is not, and should not be taken as an acknowledgement or any form of suggestion that the reference or mentioned method/apparatus is prior art with respect to any invention disclosed or claimed herein or that it alone, or in any combination with any other reference or references, teaches, suggests or discloses any such invention or forms part of the common general knowledge in any country in the world. Further, to the extent that any meaning or definition of a term in this document conflicts with any meaning or definition of the same term in a document incorporated by reference, the meaning or definition assigned to that term in this document shall govern.

The various portions of the present disclosure, such as the Background, Summary, Brief Description of the Drawings, and Abstract sections, are provided to comply with requirements of the MPEP and are not to be considered an admission of prior art or a suggestion that any portion or part of the disclosure constitutes common general knowledge in any country in the world. The present disclosure is provided as a discussion of the inventor's own work and improvements based on the inventor's own work. See, e.g., *Riverwood Intl Corp. v. R. A. Jones & Co.,* 324 F.3d 1346, 1354 (Fed. Cir. 2003).

The invention claimed is:

1. An apparatus for three-dimensional printing of a finished article, the apparatus comprising:

a printing space comprising an air-filled inner volume and a printing substrate;

a reservoir configured to contain a supply of a liquid build material, the liquid build material comprising a polymer dissolved in a solvent;

a nozzle coupled to the reservoir and configured to dispose a volume of the liquid build material into the air-filled inner volume of the printing space;

a nebulizer configured to nebulize a coagulation agent and disperse the nebulized coagulation agent within a distance from the disposed volume of liquid build material, wherein a first affinity between the coagulation agent and the solvent is higher than a second affinity between the coagulation agent and the polymer such that the coagulation agent causes at least partial coagulation of the polymer from the disposed volume of liquid build material; and
a computing device configured to control, based at least upon the distance from the disposed volume of liquid build material at which the nebulized coagulation agent is dispersed, the first affinity between the coagulation agent and the solvent, and the second affinity between the coagulation agent and the polymer, movement of the nozzle and the disposing of the volume of the liquid build material into the air-filled inner volume of the printing space.

2. The apparatus of claim 1, further comprising:
a solidification bath comprising a coagulation fluid, the solidification bath configured to, in an instance in which the nebulized coagulation agent only partially coagulates the disposed volume of liquid build material, receive the intermediate article and cause, via the coagulation fluid, the intermediate article to fully solidify, thereby forming the finished article.

3. The apparatus of claim 1, wherein the polymer comprises one of: a thermoplastic polymer, a thermosetting polymer, acrylonitrile-butadiene-styrene, a polyurethane, acrylic, poly(acrylonitrile), a polyolefin, a polyvinyl chloride, a nylon, a fluorocarbon, a polystyrene, a polyethylene (PE), an ultra-high molecular weight polyethylene, a polypropylene (PP), a polybutene, a polymethylpentene, a polyisoprene, an ethylene-butene copolymer, an ethylene-hexene copolymer, a polyimide (PI), a poly amide (PA), a poly amide imide (PAI), a ethylene vinylacetate (EVA), a poly (ethylene terephthalate) (PET), a poly(vinyl acetate) (PVA), an acrylic adhesive, an ultraviolet (UV)/electron beam (EB)/infrared (IR) curable resin, a polyether ether ketone (PEEK), a polyethylene naphthalate (PEN), a polyethersulfone (PES), a polyphenylene sulfide (PPS), or a polyphenylene oxide (PPO).

4. The apparatus of claim 1, wherein the solvent comprises one of: dimethyl sulfoxide (DMSO), dimethylformamide (DMF), acetonitrile, ethanol, N-methylpyrrolidone, cyclodextrin, a pluronic detergent, liposomes, sodium methyl sulfinylmethylide, dimethyl sulfide, dimethyl sulfone, acetone, dimethylformamide, dimethylacetamide, N-methyl-2-pyrrolidone, hexamethylphosphoramide (HMPA), methanol, isopropanol, tert-butanol, acetic acid, ether, tetrahydrofuran, dichloromethane, chloroform, triethylamine, pyridine, or ethyl acetate.

5. An apparatus for three-dimensional printing of an article, the apparatus comprising:
a nozzle configured to receive a volume of a liquid build material and dispose at least a portion of the volume of the liquid build material into an air-filled inner volume of a printing space, the liquid build material comprising a polymeric material in a solvent;
a nebulizer configured to nebulize a coagulation agent and disperse at least a portion of the nebulized coagulation agent within a distance of the disposed liquid build material, wherein a first affinity between the coagulation agent and the solvent is higher than a second affinity between the coagulation agent and the polymeric material such that the coagulation agent causes at least partial coagulation of the polymeric material from the disposed liquid build material; and
a computing device configured to control, based at least upon the distance from the disposed volume of liquid build material at which the nebulized coagulation agent is dispersed, the first affinity between the coagulation agent and the solvent, and the second affinity between the coagulation agent and the polymer, movement of the nozzle within the printing space, the computing device being further configured to control the disposing of the liquid build material into the air-filled inner volume of the printing space and the dispersion of the nebulized coagulation agent within the printing space.

6. The apparatus of claim 5, further comprising:
a reservoir configured to contain a supply of the liquid build material.

7. The apparatus of claim 5, further comprising:
a solidification bath comprising a coagulation fluid, the solidification bath configured to, in an instance in which the nebulized coagulation agent only partially coagulates the disposed volume of liquid build material, receive the article and cause, via the coagulation fluid, the article to fully solidify, thereby forming a finished article.

8. The apparatus of claim 5, wherein, in an instance in which a volume of the liquid build material is disposed onto the substrate within the air-filled inner volume of the printing space and a volume of the nebulized coagulation agent is disposed within said distance of the disposed volume of the liquid build material during a time following said disposing of the volume of the liquid build material onto the substrate, the disposed volume of the liquid build material is caused to at least partially coagulate upon reaction with the volume of the nebulized coagulation agent.

9. The apparatus of claim 5, wherein the nozzle is configured and dimensioned to move along a path within the volume of air to dispose a volume of the liquid build material.

10. The apparatus of claim 9, wherein the path is determined by the computing device based upon an input design file comprising a design of the article.

11. The apparatus of claim 9, wherein the apparatus is configured to communicate the liquid build material from one or more reservoirs, through the nozzle, and into the volume of air.

12. The apparatus of claim 1, wherein said affinity is a Hansen solubility.

13. The apparatus of claim 5, wherein the first affinity is based upon a Hansen solubility between the coagulation agent and the solvent, and wherein the second affinity is based upon the Hansen solubility between the coagulation agent and the polymeric material.

14. An apparatus for three-dimensional printing of a finished article, the apparatus comprising:
a nozzle configured to receive a volume of a liquid build material and dispose at least a portion of the volume of the liquid build material into an air-filled inner volume of a printing space, the liquid build material comprising a polymer dissolved in a solvent;
a nebulizer configured to nebulize a non-solvent coagulation agent and disperse at least a portion of the nebulized non-solvent coagulation agent within a distance from the disposed liquid build material, wherein a first affinity between the non-solvent coagulation agent and the solvent is higher than a second affinity between the non-solvent coagulation agent and the polymer such that the non-solvent coagulation agent causes at least partial coagulation of the polymer from the disposed liquid build material; and
a computing device configured to control movement of the nozzle within the printing space, control the disposing of the liquid build material into the air-filled inner volume of the printing space, and control the dispersion of the nebulized non-solvent coagulation agent within the printing space, wherein the computing device is configured to control the dispersion of the nebulized non-solvent coagulation agent and the distance from the disposed liquid build material based upon at least the first affinity between the non-solvent coagulation agent and the solvent and the second affinity between the non-solvent coagulation agent and the polymer.

15. The apparatus of claim 14, further comprising:
a reservoir configured to contain a supply of the liquid build material.

16. The apparatus of claim 14, further comprising:
a solidification bath comprising a coagulation fluid, the solidification bath configured to, in an instance in which the nebulized non-solvent coagulation agent only partially coagulates the disposed volume of liquid build material, receive an intermediate article and cause, via the coagulation fluid, the intermediate article to fully solidify, thereby forming the finished article.

17. The apparatus of claim 14, wherein, in an instance in which a volume of the liquid build material is disposed onto the substrate within the air-filled inner volume of the printing space and a volume of the nebulized non-solvent coagulation agent is disposed within said distance of the disposed volume of the liquid build material during a time following said disposing of the volume of the liquid build material onto the substrate, the disposed volume of the liquid build material is caused to at least partially coagulate upon a phase-inversion reaction with the volume of the nebulized non-solvent coagulation agent.

18. The apparatus of claim 14, wherein the nozzle is configured and dimensioned to move along a path within the volume of air to dispose a volume of the liquid build material.

19. The apparatus of claim 18, wherein the path is determined by the computing device based upon an input design file comprising a design of the finished article.

20. The apparatus of claim 18, wherein the apparatus is configured to communicate the liquid build material from one or more reservoirs, through the nozzle, and into the volume of air.

21. The apparatus of claim 14, wherein the first affinity is based upon a Hansen solubility between the non-solvent coagulation agent and the solvent, and wherein the second affinity is based upon the Hansen solubility between the non-solvent coagulation agent and the polymer.

* * * * *